United States Patent
Wilson et al.

(10) Patent No.: US 11,326,574 B2
(45) Date of Patent: May 10, 2022

(54) NONLINEAR HYDROSTATIC CONTROL OF A WAVE ENERGY CONVERTER

(71) Applicants: National Technology & Engineering Solutions of Sandia, LLC, Albuquerque, NM (US); Michigan Technological University, Houghton, MI (US)

(72) Inventors: David G. Wilson, Tijeras, NM (US); Giorgio Bacelli, Albuquerque, NM (US); Ryan Geoffrey Coe, Albuquerque, NM (US); Rush D. Robinett, III, Tijeras, NM (US); Ossama Abdelkhalik, Ames, IA (US)

(73) Assignees: National Technology & Engineering Solutions of Sandia, LLC, Albuquerque, NM (US); Michigan Technological University, Houghton, MI (US)

( * ) Notice: Subject to any disclaimer, the term of this patent is extended or adjusted under 35 U.S.C. 154(b) by 74 days.

(21) Appl. No.: 16/792,749

(22) Filed: Feb. 17, 2020

(65) Prior Publication Data
US 2020/0355153 A1 Nov. 12, 2020

Related U.S. Application Data

(63) Continuation-in-part of application No. 16/534,746, filed on Aug. 7, 2019, now Pat. No. 10,823,134.
(Continued)

(51) Int. Cl.
*F03B 13/18* (2006.01)
*B63B 22/00* (2006.01)

(52) U.S. Cl.
CPC .......... *F03B 13/1885* (2013.01); *B63B 22/00* (2013.01)

(58) Field of Classification Search
CPC . B63B 2035/4466; B63B 22/00; B63B 22/04; F03B 13/1885; F05B 2250/20;
(Continued)

(56) References Cited

U.S. PATENT DOCUMENTS 4,447,740 A * 5/1984 Heck ...................... F03B 13/22
                                                        290/53
5,136,173 A * 8/1992 Rynne .................. H02K 44/085
                                                        290/53
(Continued)

OTHER PUBLICATIONS

Wolgamont, H.A. and Fitizgerald, C.J., "Nonlinear Hydrodynamic and Real Fluid Effects on Wave Energy Converters", Proc. Inst. Mech Eng. A: J. Power Eng. (2015), pp. 772-794, vol. 229.
(Continued)

*Primary Examiner* — Jesse S Bogue
(74) *Attorney, Agent, or Firm* — Kevin W. Bieg

(57) ABSTRACT

Increased energy harvesting is realized using a nonlinear buoy geometry for reactive power generation. By exploiting the nonlinear dynamic coupling between the buoy geometry and the potential wideband frequency spectrum of incoming waves in the controller/buoy design, increased power can be captured in comparison to conventional wave energy converter designs. In particular, the reactive power and energy storage system requirements are inherently embedded in the nonlinear buoy geometry, therefore requiring only simple rate-feedback control.

8 Claims, 23 Drawing Sheets

Related U.S. Application Data

(60) Provisional application No. 62/927,590, filed on Oct. 29, 2019, provisional application No. 62/927,318, filed on Oct. 29, 2019, provisional application No. 62/730,891, filed on Sep. 13, 2018.

(58) Field of Classification Search
CPC ............ F05B 2250/21; F05B 2250/232; F05B 2250/33; Y02E 10/30
See application file for complete search history.

(56) References Cited

U.S. PATENT DOCUMENTS

| | | | | |
|---|---|---|---|---|
| 8,464,527 | B2* | 6/2013 | Gerber | F03B 13/1845 60/495 |
| 8,925,313 | B2* | 1/2015 | Moffat | F03B 13/22 60/502 |
| 9,657,710 | B2* | 5/2017 | Gregory | F03B 13/20 |
| 9,951,747 | B2* | 4/2018 | Prins | F03B 15/02 |
| 10,190,568 | B2* | 1/2019 | Gregory | F03B 13/18 |
| 10,385,820 | B2* | 8/2019 | Moffat | F03B 11/02 |
| 10,605,226 | B2* | 3/2020 | Sheldon-Coulson | F03B 17/06 |
| 10,634,113 | B2* | 4/2020 | Sheldon-Coulson | H02K 7/183 |
| 11,028,819 | B2* | 6/2021 | Sheldon-Coulson | H02K 7/183 |
| 2011/0089689 | A1* | 4/2011 | Gregory | F03B 13/20 290/42 |
| 2018/0202415 | A1* | 7/2018 | Moffat | F03B 13/22 |

OTHER PUBLICATIONS

Giorgi, G. et al.,"Nonlinear Hydrodynamic Models for Heaving Buoy Wave Energy Converters", Asian Wave and Tidal Energy Conference (AWTEC 2016), Marina Bay Sands, Signapore (2016), 10 pages.

Retes, M. et al., "A Review of Non-Linear Approaches for Wave Energy Converter Modelling", Proceedings of the 11th European Wave and Tidal Energy Conference, Nantes, France (2015), 10 pages.

Abdelkhalik, O. and Darani, S. "Optimization of Nonlinear Wave Energy Converters", Ocean Engineering, 2018, pp. 187-195, vol. 162.

Darani, S. et al.,"A Hamiltonian Surface-Shaping Approach for Control System Analysis and the Design of Nonlinear Wave Energy Converters", Journal of Marine Science and Engineering (2019), vol. 7, 48, 17 pages.

Hals, J. et al., "A Comparison of Selected Strategies for Adaptive Control of Wave Energy Converters", J. Offshore Mech. Arct. Eng. (2011), vol. 133, pp. 031101-1-031101-12.

Song, J. et al., "Multi-Resonant Feedback Control of Heave Wave Energy Converters", Ocean Engineering (2016), pp. 269-278, vol. 127.

Abdelkhalik, O. et al., "Multiresonant Feedback Control of a Three-Degree-of-Freedom Wave Energy Converter", IEEE Transactions on Sustainable Energy (2017), pp. 1518-1527, vol. 8.

Robinett, Rush D. and Wilson, David, "What Is a Limit Cycle?", International Journal of Control (2008), pp. 1886-1900, vol. 81.

* cited by examiner

NONLINEAR HYDROSTATIC CONTROL OF A WAVE ENERGY CONVERTER

CROSS-REFERENCE TO RELATED APPLICATIONS

This application is a continuation-in-part of U.S. application Ser. No. 16/534,746, filed Aug. 7, 2019, which claims the benefit of U.S. Provisional Application No. 62/730,891, filed Sep. 13, 2018, both of which are incorporated herein by reference. This application also claims the benefit of U.S. Provisional Application No. 62/927,318, filed Oct. 29, 2019, and U.S. Provisional Application No. 62/927,590, filed Oct. 29, 2019, both of which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy conversion and, in particular, to a shaped buoy that provides nonlinear hydrostatic control of a wave energy converter.

BACKGROUND OF THE INVENTION

Extracting power from ocean waves is receiving much attention. There is a bountiful undeveloped potential in ocean wave power which is estimated at 8,000-80,000 TWh/yr or 1-10 TW of future energy and power generation. See R. Boud, "Status and Research and Development Priorities, Wave and Marine Accessed Energy," DTI Report No. FES-R-132, UK Dept. of Trade and Industry, United Kingdom (2003). Each wave crest on the average has the potential to produce a power density of between 10-50 kW/m. See A. Muetze and J. G. Vining, "Ocean Wave Energy Conversion—A Survey," 2006 *IEEE Industry Applications Conference 41$^{st}$ IAS Annual Meeting*, Tampa, Fla., USA (2006).

Many different devices and control strategies have been proposed. A simple point absorber wave energy converter (WEC) consists of a floating buoy connected to a vertical hydraulic cylinder (spar) which are attached at the bottom to the seabed or to a large body whose vertical motion is negligible relative to the buoy. When the buoy moves due to waves, the hydraulic cylinders drive hydraulic motors which in turn drive a generator. See G. Li et al., *Renew. Energy* 48, 392 (2012). Regarding the WEC control, most of the existing literature describe controls that are designed using a linear dynamic model. See J. A. Falnes, *Mar. Struct.* 20, 185 (2007); and J. Ringwood et al., *IEEE Control Syst.* 34, 30 (2014). For instance, Li implements dynamic programming while Hals uses a gradient-based algorithm to search for the optimal control. See G. Li et al., *Renew. Energy* 48, 392 (2012); and J. Hals et al., *J. Offshore Mech. Arct. Eng.* 133, 031101 (2011). A model predictive control (MPC) can be used. See J. Cretel et al., *IFAC Proc.* 44(1), 3714 (2011). Bacelli utilized the pseudo-spectral method whereas Abdelkhalik developed a shape-based approach that needs a fewer number of approximated states compared to the pseudo-spectral method of Faedo. See G. Bacelli et al., *Proc. 18th IFAC World Congress*, 11387 (2011); O. Abdelkhalik et al., *ASME Power & Energy* 2015, San Diego, Calif. (2015); O. Abdelkhalik et al., *J. Ocean Eng. Mar. Energy* 2, 473 (2016); and N. Faedo et al., *IFAC J. Syst. Control* 1, 37 (2017). In the presence of limitations on the control actuation level, a bang-bang suboptimal control has been proposed. See E. Abraham, *Optimal Control and Robust Estimation for Ocean Wave Energy Converters*, PhD thesis, Department of Aeronautics, Imperial College London (2013).

Most often, WEC devices have been based on simple on/off or simple resonant frequency operation. Conventional WEC devices generate power over a small band of the full wave frequency spectrum. Typically, these WECs resonate at a frequency matching the dominant wave frequency. When a wave impacts the WEC device at the resonance frequency, the device can absorb a significant amount of energy from the wave very efficiently. However, when the WEC is off-resonance with the impacting waves the WEC operates much less efficiently. To be competitive with other energy market technologies and maximize economic return in the form of energy and electrical power, the WEC must be capable of operation and energy capture over the full range of sea states. The full sea state range includes highly nonlinear sea state conditions during the power production mode. See M. Retes et al., "A Review of Non-Linear Approaches for Wave Energy Converter Modelling," *Proc. of the 11th European Wave and Tidal Energy Conference, Nantes*, France, September 2015. A large reduction in buoy sizes and improvements in year around power capture through multi-resonance will be required to make WEC deployment location independent. By focusing on multi-resonance, a large increase in power will enable a reduction in both size and weight, making modern WEC designs more efficient.

There are multiple sources of possible nonlinearities in the WEC dynamic model. See A. Wolgamot and C. Fitzgerald, Proc. Inst. Mech. Eng. A *J. Power Eng.* 229, 772 (2015). For example, if the buoy shape is not perpendicular near the water surface then the hydrostatic force will be nonlinear. The hydrodynamic forces can also be nonlinear in the case of large motion. See G. Giorgi et al., "Nonlinear Hydrodynamic Models for Heaving Buoy Wave Energy Converters," *Asian Wave and Tidal Energy Conference (AWTEC* 2016), Marina Bay Sands, Singapore, 2016. Control strategies that aim at maximizing the harvested energy will increase the motion amplitude and hence amplify these nonlinearities. Abdelkhalik and Darani assumed an optimized system's nonlinear force to drive the design of the WEC resulting in increased energy capture with a reduction in reactive power. See O. Abdelkhalik and S. Darani, *Ocean Eng.* 162, 187 (2018). Darani took Hamiltonian surface-shaping (HSS) nonlinear control with nonlinearities due to the geometry and/or the PTO into account, resulting in increased harvesting of energy. See S. Darani et al., *J. Mar. Sci. Eng.* 7, 48 (2019).

Complex conjugate control (CCC) has been developed in many references. See J. Hals et al., *J. Offshore Mech. Arct. Eng.* 133, 031101 (2011); and J. Falnes, *Ocean Waves and Oscillating Systems*, 1st ed.; Cambridge University Press: Cambridge, N Y, 2002. Proportional-Derivative CCC or PDC3 applies the principle of superposition of linear systems and solves for the optimal PD feedback controller to approximate the CCC for a regular wave or an irregular wave approximated by a Fourier series. See J. Song et al., *Ocean Eng.* 127, 269 (2016); O. Abdelkhalik et al., *IEEE Trans. Sustain. Energy* 8, 1518 (2017); and D. Wilson et al., "A comparison of WEC control strategies," Sandia National Laboratories, SAND2016-4293 (2016). In the context of Hamiltonian surface-shaping and power flow control (HSSPFC), the PD feedback controller shapes the Hamiltonian (energy surface) to make the linear WEC resonate and emulate an electrical power network with a power factor of one at all frequencies approximated by the Fourier series. See R. Robinett and D. Wilson, *Nonlinear Power Flow Control Design: Utilizing Exergy, Entropy, Static and Dynamic Stability, and Lyapunov Analysis*; Springer-Verlag London Limited, 2011.

In FIG. 1 is shown the theoretical capture ratio as a function of non-dimensional capture times, where $T/T_{res}$ is the ratio of the period of the wave T over the resonant period of the WEC device $T_{res}$. The theoretical capture ratios are shown as the theoretical limit (dashed line), theoretical limit with viscous losses (dash-dot line), and the resistive control baseline (solid line). Resonance is when $T/T_{res}=1.0$. As described above, a WEC device operates at maximum energy absorption at resonance. A popular technique is to design a resistive or resonant controller around $T/T_{res}=1.0$, however, energy capture drops off the farther away the dominant wave input frequencies are from resonance. See J. Hals et al., *J. Offshore Mech. Arct. Eng.* 133, 031101 (2011). In off-resonance, the WEC absorbs less real power and will require reactive power to increase energy capture. Reactive power is represented as the hatched area under the dash-dot line. Reactive power can be realized with feedback control. Theoretically, CCC can achieve the limit w/losses curve (dash-dot line), with increases in power capture from 7× to 40× far from resonance, as shown. Practically, CCC can be achieved with MPC or PDC3. See J. Hals et al., *J. Offshore Mech. Arct. Eng.* 133, 031101 (2011); G. Li et al., *Renew. Energy* 48, 392 (2012); J. A. Cretel et al., *IFAC Proc.* 44(1), 3714 (2011); and J. Song et al., *Ocean Eng.* 127, 269 (2016). However, both techniques require energy storage and power electronic elements and additional complexity to meet the reactive power requirements. MPC also needs wave prediction as an a priori input.

SUMMARY OF THE INVENTION

The present invention is directed to a nonlinear wave energy converter, comprising a shaped buoy in a body of water having a wave motion, wherein the waves impacting the buoy exert an excitation force with a plurality of excitation frequencies that causes a buoy motion in a heave direction relative to a reference and wherein the buoy has a shape that produces reactive power from the wave motion. In general, the buoy can have any shape that is curved outwardly from the vertical axis of the buoy away from the water line. The buoy shape can be axisymmetric. The buoy shape can be mirrored or no mirrored about the water line. For example, the buoy can have an hourglass shape comprising mirrored right circular cones.

The nonlinear buoy geometry of the present invention produces energy storage and reactive power through nonlinear coupling between the buoy and wave interaction. The nonlinear buoy design shows desirable characteristics: 1) no required reactive power or energy storage due to the geometric buoy shape, 2) no cancellation of nonlinear terms that consume power, 3) the nonlinear resonator increases the capture width by including sub/super harmonics in the input waves, 4) by increasing the draft and speed of the nonlinear buoy more energy is harvested, and 5) the nonlinear buoy shape creates equivalent wave height and buoy motion measurements that are naturally incorporated.

The invention further extends CCC of linear WECs to nonlinear (NL) WECs by designing optimal limit cycles with HSSPFC. The CCC for a regular wave is equivalent to a power factor of one in electrical power networks, equivalent to mechanical resonance in a mass-spring-damper (MSD) system, and equivalent to a linear limit cycle constrained to a Hamiltonian surface defined in HSSPFC. Specifically, the optimal linear limit cycle is defined as a second-order center in the phase-plane projection of the constant energy orbit across the Hamiltonian surface. This concept of CCC described by a linear limit cycle constrained to a Hamiltonian surface is extended to NL limit cycles constrained to a Hamiltonian surface to maximize energy harvesting or extraction from the wave motion by a NL WEC.

BRIEF DESCRIPTION OF THE DRAWINGS

The detailed description will refer to the following drawings, wherein like elements are referred to by like numbers.

DETAILED DESCRIPTION OF THE INVENTION

A practical CCC algorithm in the time-domain targets both amplitude and phase through feedback that is constructed from individual frequency components that can come from the spectral decomposition of the measurements signal. This feedback strategy focuses on decomposing the WEC output response to the wave input, into a sum of individual frequencies for which a PD feedback controller is designed for each frequency. The proportional gain is designed for each feedback channel to produce resonance and the derivative channel produces the maximum absorbed power. See J. Song et al., *Ocean Eng.* 127, 269 (2016); O. Abdelkhalik et al., *IEEE Trans. Sustain. Energy* 8, 1518 (2017); and Pub. No. US 2018/0164755 to Abdelkhalik, published Dec. 4, 2017; which are incorporated herein by reference. For isolated microgrid connected WECs, an energy storage device can be employed in combination with the PD controller to realize the specified reactive power between cycles. A multi-channel equalizer type amplifier can be used to capture multiple frequencies that span the entire sea state.

Figure 1:
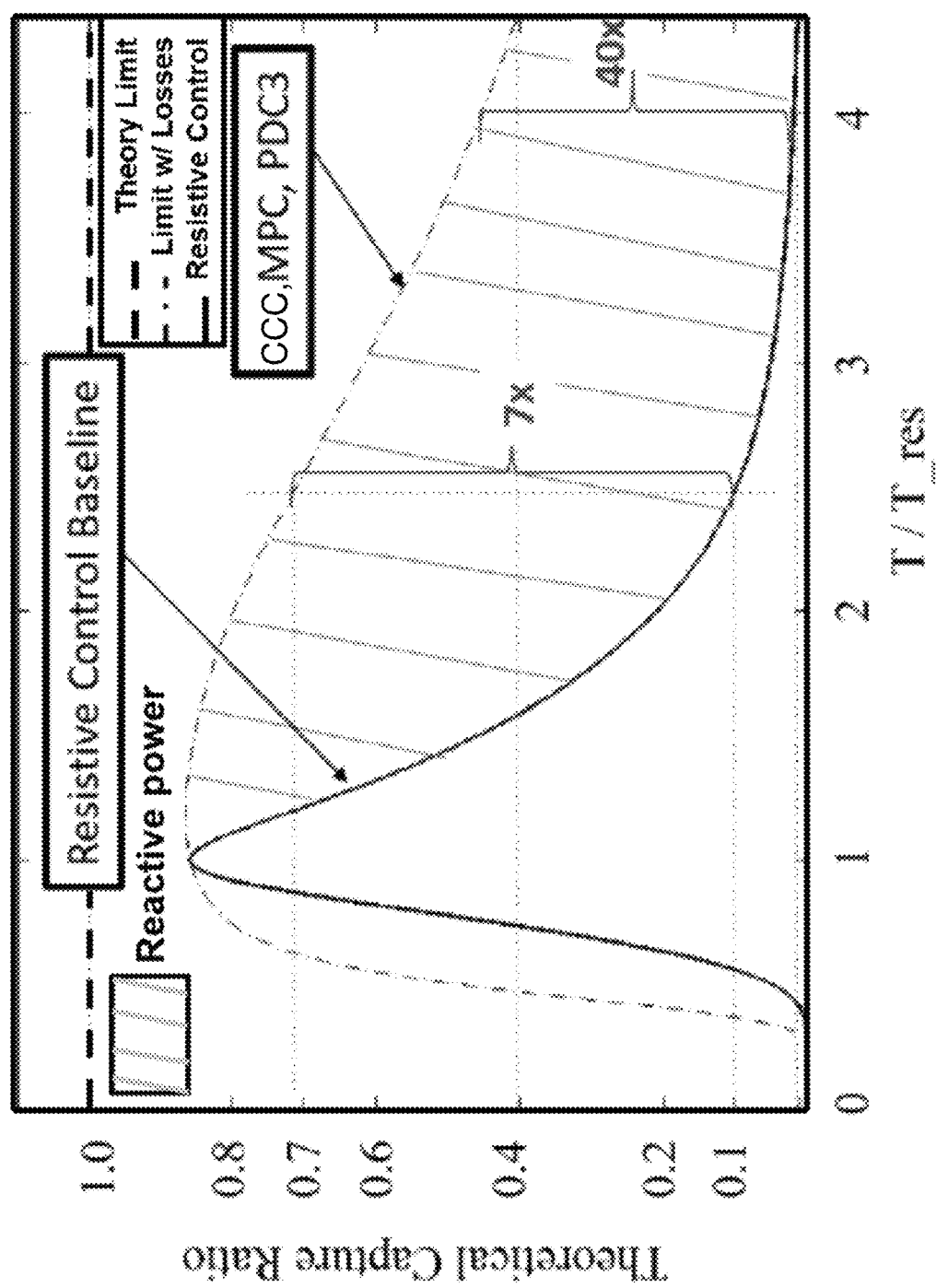
FIG. 1 is a graph showing the capture ratios for different control strategies for a heave one degree-of-freedom WEC: complex conjugate control (CCC), model predictive control (MPC), and proportion-derivative complex conjugate control (PDC3).
Figure 2:
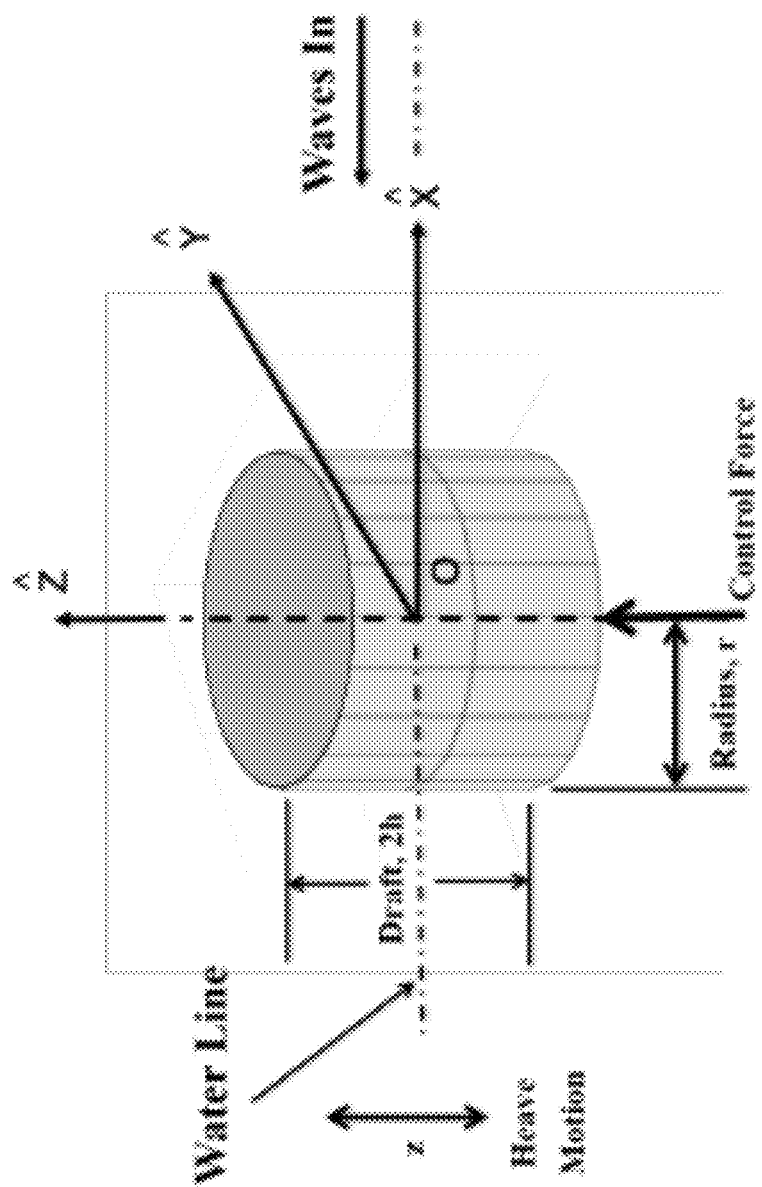
FIG. 2 is a schematic illustration of a right circular cylinder (RCC) WEC.

Initially, a right-circular-cylinder (RCC) WEC device, as shown in FIG. 2, can be modeled as a simple linear mass-spring-damper (MSD) plant dynamic with a sum of multiple frequency content input excitation forces and the controller input force as $$m\ddot{z} + c\dot{z} + kz = \sum_{j=1}^{N} F_{ex_j} \sin\Omega_j t + F_u \quad (1)$$

where z is the heave displacement of the buoy, m is the buoy mass, c is a damping coefficient, k is the hydrostatic stiffness due to buoyancy, $F_{ex_j}$ is the wave excitation force at the frequency $\Omega_j$, and $F_u$ is the control force. The PDC3 controller can be defined as $$F_u = F_{u_{PDC3}} = \sum_{j=1}^{N} F_{u_j} = \sum_{j=1}^{N} \left[ -K_{P_j} z_j - K_{D_j} \dot{z}_j \right]. \quad (2)$$

where $K_{Pj}$ is the proportional gain coefficient and $K_{Dj}$ is the coefficient for the derivative term. See J. Song et al., *Ocean Eng.* 127, 269 (2016); D. Wilson et al., "Order of Magnitude Power Increase from Multi-Resonance Wave Energy Converters," *Oceans' 17 MTS/IEEE*, Anchorage, Ak., September 2017.

The challenges for the PDC3 controller are the required reactive power and the associated energy storage system. The nonlinear WEC of the present invention solves these problems with nonlinear hydrostatic control provided by a shaped buoy.

Electrical Power Networks, Mechanical Oscillators, and Linear Limit Cycles

As will be described below, CCC for a regular wave is equivalent to a power factor of one in an electrical power network, equivalent to mechanical resonance in a MSD system, and equivalent to a linear limit cycle constrained to a Hamiltonian surface defined in HSSPFC. Specifically, the optimal linear limit cycle is defined as a second-order center in the phase-plane projection of the constant energy orbit across the Hamiltonian surface. See R. Robinett and D. Wilson, *Nonlinear Power Flow Control Design: Utilizing Exergy, Entropy, Static and Dynamic Stability, and Lyapunov Analysis*, Springer-Verlag London Limited, 2011; and R. Robinett and D. Wilson, *Int. J. Control* 81, 1886 (2008).

A linear limit cycle is a strange concept to most people since limit cycles are typically associated with nonlinear systems. See R. Robinett and D. Wilson, *Int. J. Control* 81, 1886 (2008). A limit cycle is defined as a closed trajectory in phase space having the property that at least one other trajectory spirals into it either as time approaches infinity or as time approaches minus infinity. In particular, a center of a second-order system can be interpreted as a linear limit cycle which, for example, is the goal of power engineering. See K. Ogata, *Modern Control Engineering*, Englewood Cliffs, N.J., Prentice-Hall, Inc., 1970.

The Hamiltonian for natural systems is the stored energy, and its time derivative is the power flow into, dissipated within, and stored in the system. Therefore, for a conservative system, the time derivative of the Hamiltonian is zero which leads to a constant energy orbit constrained to the Hamiltonian surface. This constant energy orbit also occurs when the power flow into the system is balanced by the power being dissipated by the load. See R. Robinett and D. Wilson, *Nonlinear Power Flow Control Design: Utilizing Exergy, Entropy, Static and Dynamic Stability, and Lyapunov Analysis*, Springer-Verlag London Limited, 2011; and R. Robinett and D. Wilson, Int. J. Control 81, 1886 (2008).

Electrical Power Networks

The energy storage terms of the Hamiltonian for an electrical system, $H_e$, are typically associated with the capacitance, C, and inductance, L, of the electrical network such as $$\mathcal{H}_e = \mathcal{T}_e + \mathcal{V}_c = \frac{1}{2}L\dot{q}^2 + \frac{1}{2C}q^2 \quad (3)$$

where $T_e$ is the electrical kinetic energy, $V_e$ is the electrical potential energy, $\dot{q}$ is the electrical charge-rate or current, and q is the electrical charge. These terms are equivalent to mechanical kinetic and potential energy terms depending upon whether the network is voltage-controlled or current-controlled. See R. Robinett and D. Wilson, *Nonlinear Power Flow Control Design: Utilizing Exergy, Entropy, Static and Dynamic Stability, and Lyapunov Analysis*, Springer-Verlag London Limited, 2011; and R. Robinett and D. Wilson, *Int. J. Control* 81, 1886 (2008). The equation-of-motion for a RLC electrical network is $$L\ddot{q} + \frac{1}{C}q = -R\dot{q} + V_0\cos\Omega t \quad (4)$$

Figure 3:
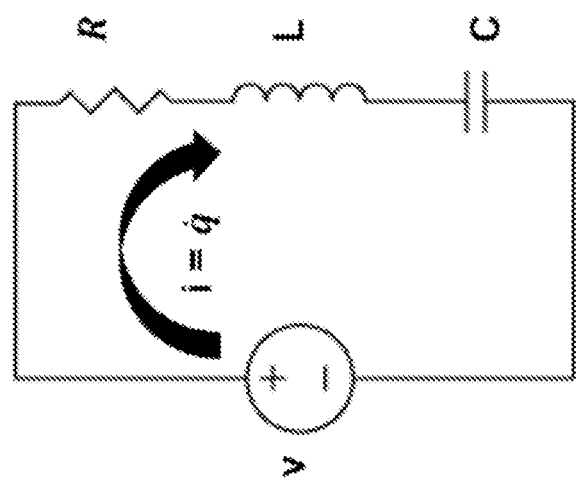
FIG. 3 is a schematic illustration of a RLC electrical network.

The electrical schematic is shown in FIG. 3.

The time derivative of the Hamiltonian is $$\dot{\mathcal{H}}_e = \left[L\ddot{q} + \frac{1}{C}q\right]\dot{q} = [-R\dot{q} + V_0\cos\Omega t]\dot{q}. \quad (5)$$

CCC uses impedance matching, which occurs for electrical systems (and equivalent for mechanical systems) when the Hamiltonian is constant, i.e., the time derivative of the Hamiltonian is zero for a conservative system $$\dot{\mathcal{H}}_e = 0 \quad (6)$$

which implies the forcing frequency of the sinusoidal voltage, $\Omega$, is equal to the natural frequency of the circuit, $\bar{\omega}$ or $$\bar{\omega}^2 = \frac{1}{LC} = \Omega^2. \quad (7)$$

and the power factor is equal to one, or $$R\dot{q} = V_0 \cos \Omega t. \quad (8)$$

See R. Smith, *Circuits, Devices, and Systems: A First Course in Electrical Engineering*, 3rd ed., New York; John Wiley & Sons, 1976.

As described below, this situation is equivalent to a mass-spring-damper (MSD) system resonating in response to a sinusoidal forcing function.

Mechanical Systems

The Hamiltonian defines the energy storage terms for a mechanical system, $H_m$, in terms of the kinetic and potential energies given as $$\mathcal{H}_m = T_m + V_m = \tfrac{1}{2}M\dot{x}^2 + \tfrac{1}{2}Kx^2 \quad (9)$$

where $T_m$ is the mechanical kinetic energy, $V_m$ is the mechanical potential energy, M is the mass, K is the stiffness, $\dot{x}$ is the velocity, and x is the displacement. The equation-of-motion for a MSD system is $$M\ddot{x} + Kx = -c\dot{x} + F_0 \cos \Omega t \quad (10)$$

Figure 4:
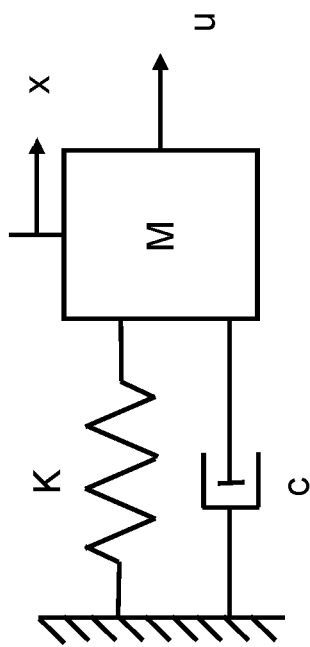
FIG. 4 is a schematic illustration of a MSD mechanical system.

The corresponding mechanical system schematic is shown in FIG. 4.

The time derivative of the Hamiltonian is $$\dot{\mathcal{H}}_m = [M\ddot{x} + Kx]\dot{x} = [-c\dot{x} + F_0 \cos \Omega t]\dot{x}. \quad (11)$$

Eq. (11) for a mechanical system is equivalent to Eq. (5) for an electrical system. The idea of resonating a mechanical system is equivalent to designing a vibration isolator that is attempting to minimize the vibration response of the main structure, such as an airplane engine. See J. D. Hartog, *Mechanical Vibrations*, McGraw-Hill, New York, 1934; and G. Habiba et al., "Generalization of Den Hartog's Equal-Peak Method for Nonlinear Primary Systems," *MATEC Web of Conferences; CSNDD 2014—International Conference on Structural Nonlinear Dynamics and Diagnosis*, September 2014, Vol. 16. Conversely, the WEC resonator design intentionally excites the mechanical system to increase power/energy capture.

Linear Limit Cycles

Figure 5B:
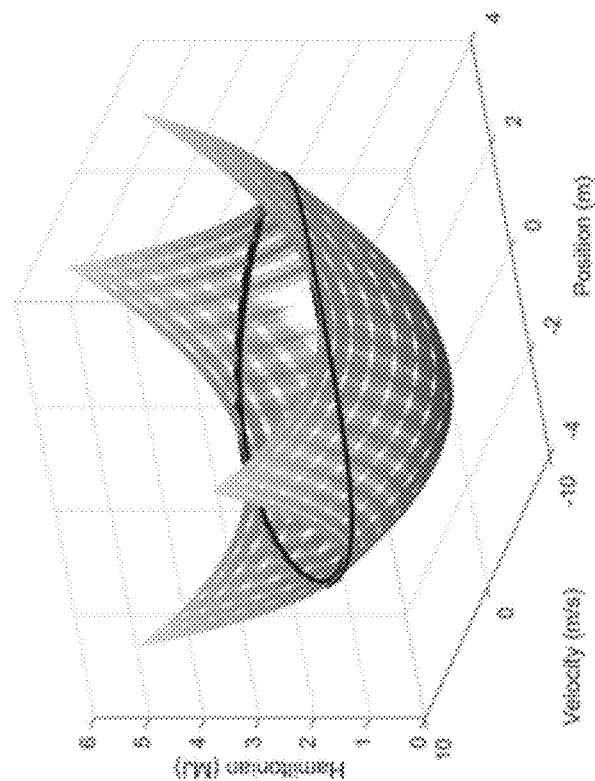
FIG. 5B illustrates a single-frequency off-resonance ($\omega\neq\Omega$) limit cycle constrained to the Hamiltonian surface for a RCC WEC.
Figure 5A:
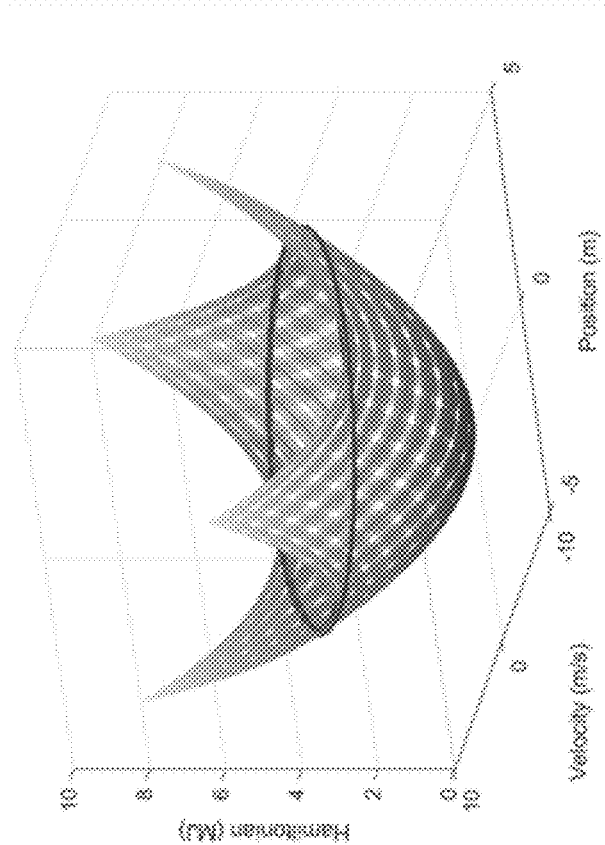
FIG. 5A illustrates a single frequency on-resonance ($\omega=\Omega$) limit cycle constrained to the Hamiltonian surface for a RCC WEC.
Figures 6A, 6B:
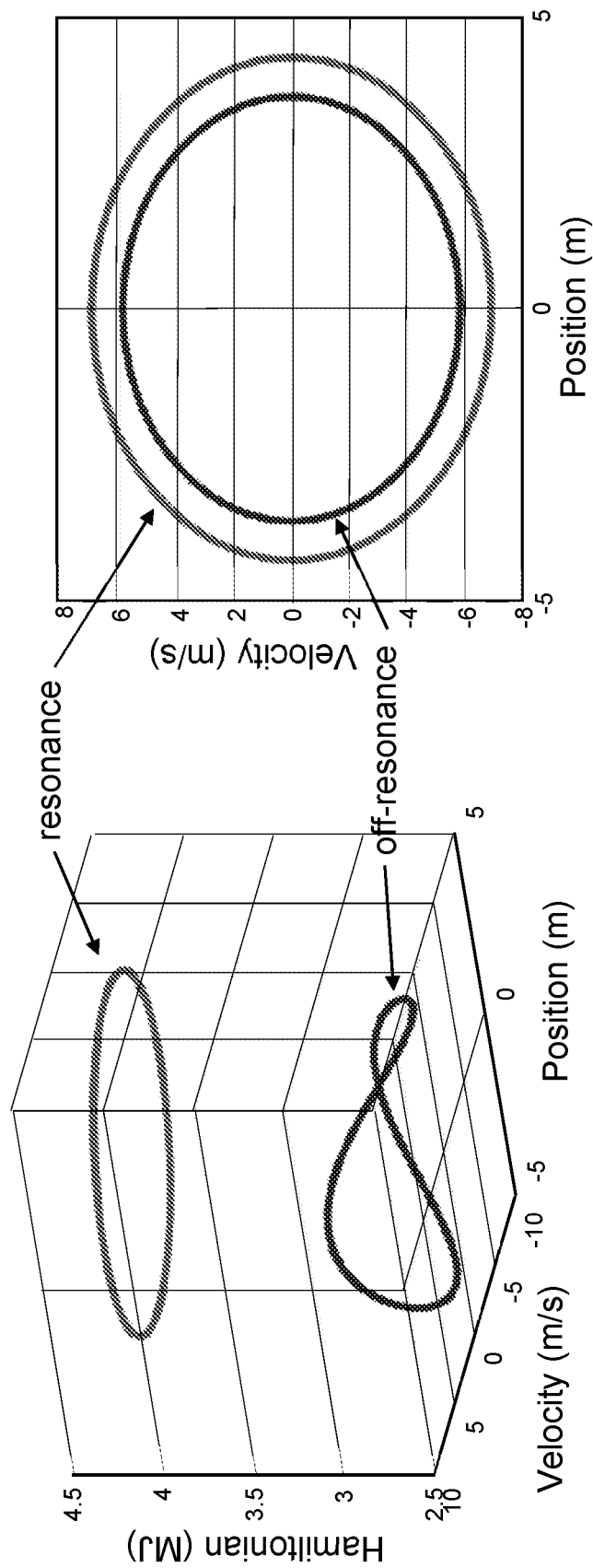
FIG. 6A compares the single frequency on-resonance and off-resonance limit cycles in 3D.
FIG. 6B shows the same comparison in phase-plane.

The optimal power/energy capture for an unconstrained linear WEC is a linear limit cycle (constant energy orbit across the Hamiltonian surface) which is also referred to as a second-order center. The optimal linear limit cycle as well as non-optimal limit cycles for non-resonating circuits and power engineering applications are discussed by Robinett and Wilson. See R. Robinett and D. Wilson, *Nonlinear Power Flow Control Design: Utilizing Exergy, Entropy, Static and Dynamic Stability, and Lyapunov Analysis*, Springer-Verlag London Limited, 2011; and R. Robinett and D. Wilson, "Nonlinear power flow control applied to power engineering," *SPEEDAM* 2008, Ishchia, Italy, June 2008. The optimal and non-optimal limit cycles for a right circular cylinder (RCC) WEC are shown in FIGS. 5A and 5B, respectively. The trajectory-of-states on the Hamiltonian can be plotted in three dimensions (3D). The corresponding limit cycle comparisons in 3D are shown in FIG. 6A. Alternatively, the two-dimensional projection of the trajectory-of-states on a position-velocity plane can be plotted as a phase plot, as shown in FIG. 6B. A linear RCC WEC equation-of-motion for a single sinusoidal frequency can be stated as $$m\ddot{z} + kz = -c\dot{z} + F_0 \cos \Omega t + F_u \quad (12)$$

where z and $\dot{z}$ are the heave displacement and velocity, respectively. The natural frequency of the system is $\omega = \sqrt{k/m}$. For the condition $\Omega = \omega$, the system will resonate.

The off-resonance case is equivalent to a parameter mismatch, which could represent differing material properties or unaccounted mass properties. A simple change of a 15% offset in stiffness or $\bar{\omega} = \sqrt{\bar{k}/m}$ with $\bar{k} = 0.85$ k is shown in the corresponding plots for the off-resonance condition. This results in a reduction in heave displacement and heave velocity. As an example, assume a simple rate feedback controller, $F_u = -R_{opt}\dot{z}$, then for the off-resonance versus resonance case the real power, $P_{real} = F_u\dot{z}$, will have a reduction in power/energy capture. The harvested energy is given as the integral of real power. The reactive power is defined as $P_{reac} = F_{reac}\dot{z}$.

Nonlinear Feedback Linearization and PDC3

A straightforward way to apply CCC to a nonlinear WEC is to apply feedback linearization. See J. J. Slotine and W. Li, *Applied Nonlinear Control*, Prentice-Hall, Inc., 1991. A nonlinear WEC controller can be designed by applying nonlinear feedback linearization to eliminate the nonlinear terms followed by applying PDC3 to the remaining linear system. A typical nonlinear WEC model for a regular wave can include nonlinear damping (Coulomb friction and typical square wave drag) and nonlinear stiffness such as $$M\ddot{z} + Kz + K_{NL}z^3 = -c\dot{z} - c_{NL_1}\text{sign}(\dot{z}) - c_{NL_2}\dot{z}|\dot{z}| + F_0 \cos \Omega t + F_u. \quad (13)$$

were $K_{NL}$ is the nonlinear feedback gain and K is the linear feedback gain. $K_{NL}z^3$ is a cubic nonlinearity term, where $K_{NL} > 0$ for a hardening or stiffening nonlinear feedback gain.

A nonlinear feedback controller can be implemented as $$F_u = F_{u_{NL}} + F_{u_{PDC_3}} \quad (14)$$

where $$F_{u_{NL}} = \hat{c}_{NL_1}\text{sign}(\dot{z}) + \hat{c}_{NL_2}\dot{z}|\dot{z}| + \hat{K}_{NL}z^3 \quad (15)$$

and $F_{u_{PDC3}}$ is a PDC3 linear feedback controller (see Eq. (2)). After applying the nonlinear feedback controller with perfect parameter cancellation, or $\hat{c}_{NL1} = c_{NL1}$, $\hat{c}_{NL2} = c_{NL2}$, and $\hat{K}_{NL} = K_{NL}$, and perfect sensor measurements the remaining system is a linear WEC for a regular wave or $$M\ddot{z} + Kz = -c\dot{z} + F_0 \cos \Omega t + F_{u_{PDCs}}. \quad (16)$$

This controller can be easily extended to irregular waves. The performance of this nonlinear controller is given for an electrical system by Robinett and Wilson. See R. Robinett and D. Wilson, *Nonlinear Power Flow Control Design: Utilizing Exergy, Entropy, Static and Dynamic Stability, and Lyapunov Analysis*, Springer-Verlag London Limited, 2012; and R. Robinett and D. Wilson, "Nonlinear power flow control applied to power engineering," *SPEEDAM* 2008, Ishchia, Italy, June 2008. A special case of nonlinear control which utilizes cubic spring feedback only was developed for a WEC and compared with PDC3 by Wilson. See D. Wilson et al., "Nonlinear Control Design for Nonlinear Wave Energy Converters," *John L. Junkins Dynamical Systems Symposium*, College Station, Tex., May 2018; and U.S. application Ser. No. 16/534,746, which are incorporated herein by reference. The issues with the nonlinear feedback linearization controller are the required reactive power and the associated energy storage system as well as the power being consumed by the cancellation of the nonlinear terms. As described below, a cubic spring controller can be realized as a nonlinear geometric buoy, which can mitigate the issues of reactive power, energy storage, and nonlinear feedback linearization.

HSSPFC and Nonlinear Limit Cycles

HSSPFC can be applied to nonlinear WECs to design nonlinear resonators which take advantage of the nonlinear dynamics, instead of eliminating them. See D. Wilson et al., "Nonlinear Control Design for Nonlinear Wave Energy Converters," *John L. Junkins Dynamical Systems Symposium*, College Station, Tex., May 2018; and U.S. application Ser. No. 16/534,746. The concept of a linear limit cycle can be extended to a nonlinear limit cycle design. See R. Robinett and D. Wilson, *Nonlinear Power Flow Control Design: Utilizing Exergy, Entropy, Static and Dynamic Stability, and Lyapunov Analysis*, Springer-Verlag London Limited, 2011; and R. Robinett and D. Wilson, Int. J. Control 81, 1886 (2008). In particular, the goal of the present invention is to maximize the power/energy capture of the nonlinear WEC by properly shaping the buoy to produce reactive power from the water and generate super- and sub-harmonics that resonate at the desired wave frequencies.

Hourglass Model Development

Figure 7:
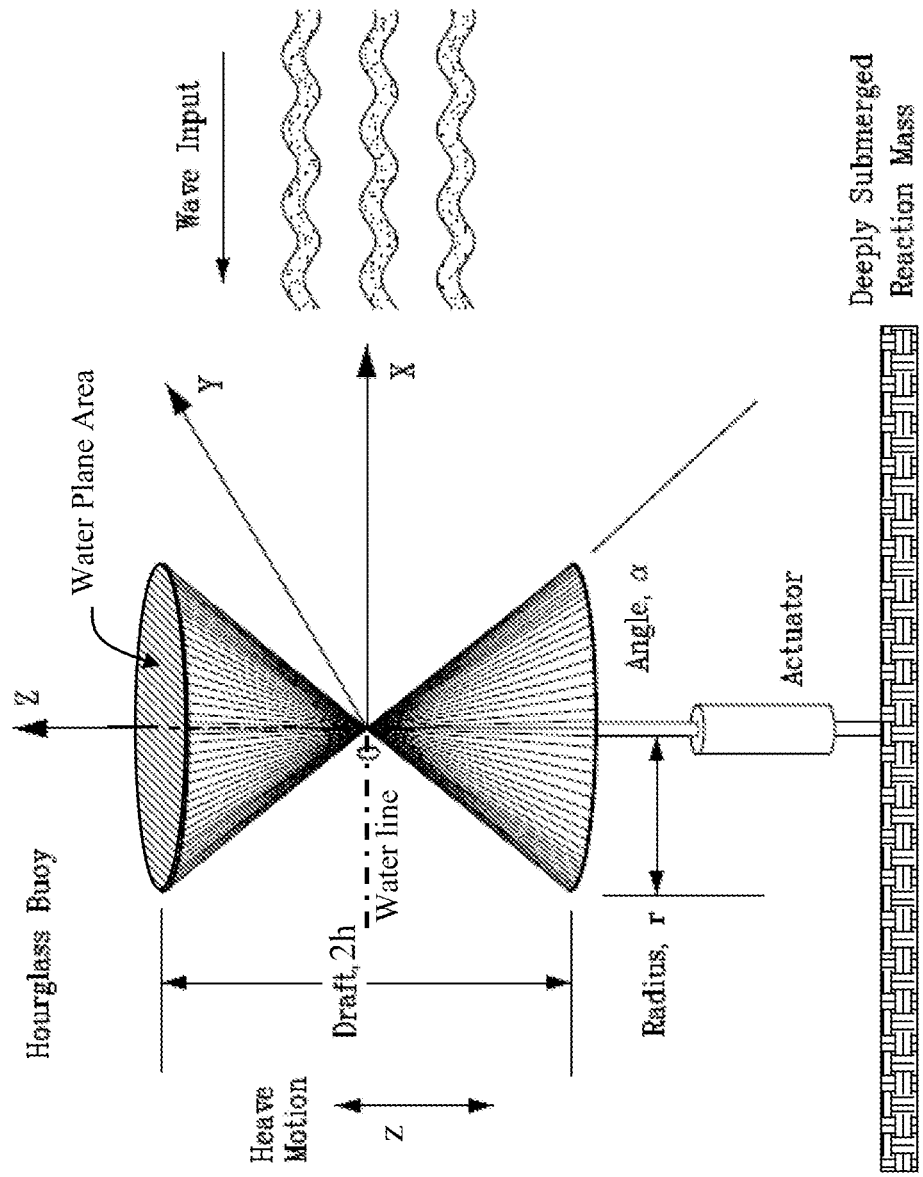
FIG. 7 is a schematic illustration of a nonlinear hourglass (HG) geometry WEC.

As an example, a cubic hardening spring equivalent can be created by shaping the WEC buoy into an hourglass (HG) shape, as shown in FIG. 7. This exemplary HG buoy comprises mirrored right circular cones having a draft, 2 h, radius, r, and cone angle, $\alpha$. The buoy is mechanically coupled to a reference, in this example a deeply submerged reaction mass. As shown, the reaction mass can remain essentially stationary as the buoy moves. The mirrored cone buoy can move up and down along a vertical Z axis in a heaving motion (a real buoy would generally move with three degrees-of-freedom, further including an up/down rotation about a center-of-gravity in a pitching motion, and back-and-forth, side-to-side displacement in a surging motion). An actuator can couple the buoy with the reaction mass and can be used to apply a control force or reactive power to the buoy. A power take-off (PTO) actuator assembly can be configured to convert the buoy motion to electrical energy, which can then be output by way of a transmission line (not shown).

Figure 8:
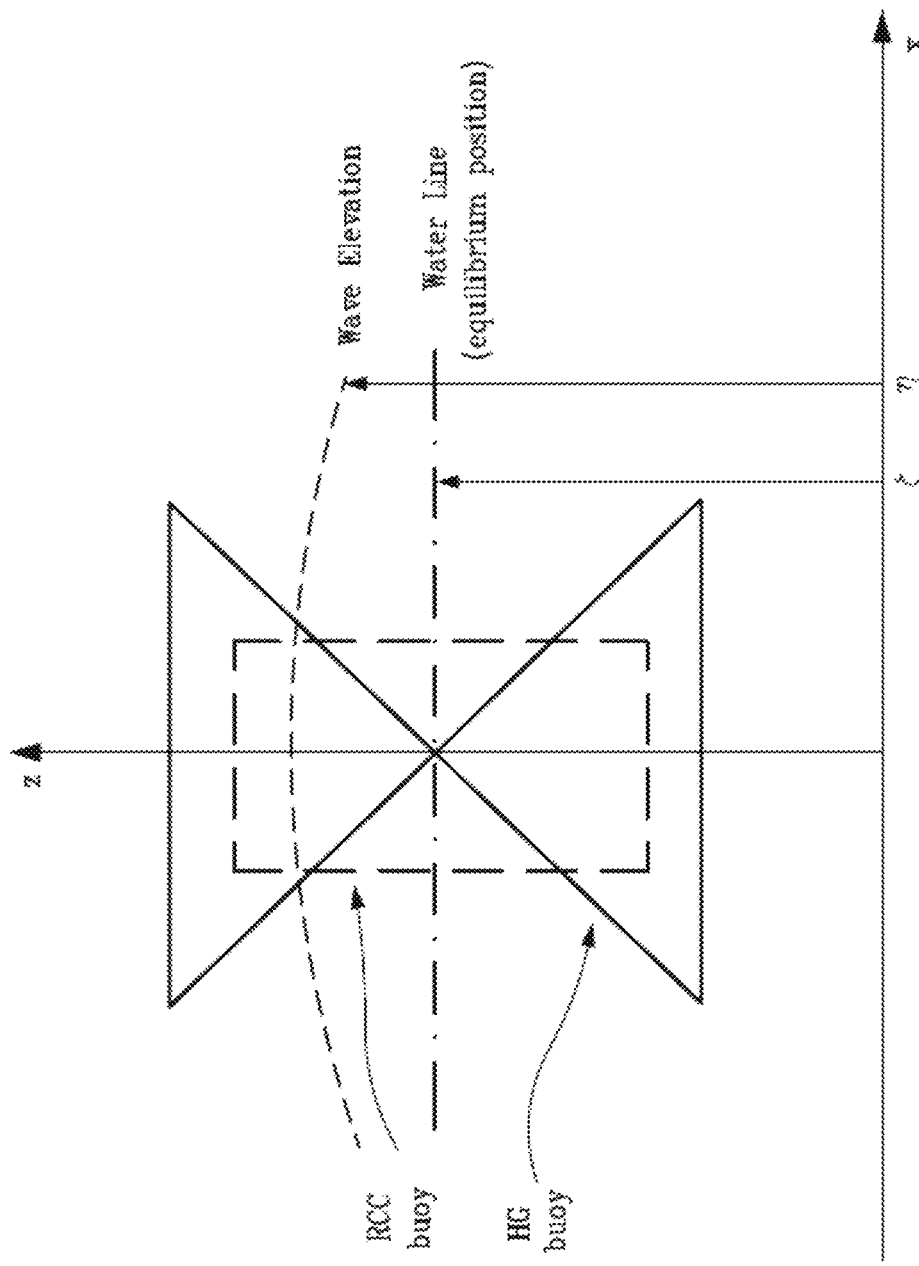
FIG. 8 illustrates 2D cross sections of RCC and HG buoy geometries.

The nonlinear HG buoy (solid line) and the vertical RCC buoy (dashed line) are illustrated in cross-section in FIG. 8. The HG buoy is modeled below using a small body approximation. See J. Falnes, *Ocean Waves and Oscillating Systems*, 1st ed., Cambridge University Press, Cambridge, N Y, 2002; and D. Wilson et al., "10× Power Capture Increased from Multi-Frequency Nonlinear Dynamics," Sandia National Laboratories, SAND2015-10446R, 2015. The volume of the HG and RCC buoys are constrained to be equal. The corresponding buoy geometric parameters for both the HG and RCC designs are given in Table 1.

TABLE 1

| HG and RCC buoy geometric parameters | | | | |
|---|---|---|---|---|
| Parameter | Symbol | HG Range | RCC Value | Unit |
| Radius | r | 5.72-10.0 | 4.47 | m |
| Height | h | 8.18-2.68 | 4.47 | m |
| Angle | $\alpha$ | 50-70 | 0.00 | deg |

A hydrostatic force is caused by the submerged volume of the HG buoy. The volume of one cone is $$V_{cone} = \tfrac{1}{3}\pi r^2 h = \tfrac{1}{3}\pi \alpha^2 h^3 \tag{17}$$

for $$r = h \tan \alpha = h\alpha. \tag{18}$$

Assuming the neutral buoyancy or water line is located at the apex of the mirrored cones, as shown in FIG. 8, the volume as a function of position of the center-of-volume is $$V(z) = \tfrac{1}{3}\pi\alpha^2 h^3 - \tfrac{1}{3}\pi\alpha^2 z^3 = \tfrac{1}{3}\pi\alpha^2 [h^3 - z^3]. \tag{19}$$

The hydrostatic force for the buoy staying in the water is $$F_h = F_g + F_{buoy} = -mg + \rho g V(z) = -\tfrac{1}{3}\pi\rho g\alpha^2 z^3. \tag{20}$$

The potential function for this hydrostatic force is $$V_{buoy} = \frac{1}{12}\pi\rho g\tilde{\alpha}^2 z^4. \tag{21}$$

A nonlinear WEC model for the HG can be developed from Falnes and Wilson, where the excitation force in heave is dominated by the hydrostatic component $$F_{ex} \approx \rho g S_w A. \tag{22}$$

See J. Falnes, *Ocean Waves and Oscillating Systems*, 1st ed., Cambridge University Press, Cambridge, N Y, 2002; and D. Wilson et al., "10× Power Capture Increased from Multi-Frequency Nonlinear Dynamics," Sandia National Laboratories, SAND2015-10446R (2015). This is essentially the hydrostatic force.

The non-uniform water plane area, $S_w$, for the cone is $$S_w(\zeta) = \pi r(z)^2 = \pi\alpha^2 [z-\zeta]^2 \tag{23}$$

where $\zeta$ is the vertical position of the center-of-volume of the HG. The hydrostatic force is proportional to the submerged volume of the body. For very long waves, the wave profile can be considered as having the same value as the vertical coordinate across the cone. That is, z~$\eta$, where $\eta$ is the wave elevation. The submerged volume is $$V_{sub} = V_{cone} + \int_\zeta^\eta \pi\tilde{\alpha}^2(z-\zeta)^2 dz \tag{24}$$

$$= V_{cone} + \int_\zeta^\eta \pi\tilde{\alpha}^2(z^2 - 2\zeta z + \zeta^2)dz$$

$$= V_{cone} + \pi \tilde{\alpha}^2 \left[ \frac{1}{3}\eta^3 - \zeta\eta^2 + \zeta^2\eta - \frac{1}{3}\zeta^3 \right].$$

Assuming the added mass and radiation damping are constant with frequency, then $$m\ddot{\zeta} = -b\dot{\zeta} - mg + \rho g V_{sub} + F_u. \quad (25)$$

Upon substitution of $V_{sub}$ from Eq. (24), the equation-of-motion is $$m\ddot{\zeta} + b\dot{\zeta} + \rho g \pi \alpha^2 \left[ \frac{1}{3}\zeta^3 - \eta\zeta^2 + \eta^2\zeta \right] = \frac{\rho g \pi \alpha^2}{3}\eta^3 + F_u \quad (26)$$

which contains the cubic spring term, $(\rho g \pi \alpha^2/3)\eta^3$. The wave elevation is given by $\eta$. The parameter $\mu g \pi \alpha^2/3$ is a function of the steepness angle $\alpha$ and the buoy mass p. The controller is defined as a rate feedback term $F_u = R_{opt}\dot{\zeta}$.

The Hamiltonian for the HG WEC is $$\mathcal{H}_{buoy} = T_{buoy} + V_{buoy} = \frac{1}{2}m\dot{\zeta}^2 + \frac{1}{12}\pi\rho g \tilde{\alpha}^2 \zeta^4 \quad (27)$$

where $T_{buoy}$ and $V_{buoy}$ are the kinetic and potential energies of the buoy, respectively. To fully understand the value of the HG WEC design, a RCC WEC with nonlinear feedback control is also developed below. The simulation results and comparisons for the HG and RCC models and controllers are described in the subsequent section.

RCC Model Development

For the RCC buoy design the hydrostatic force is caused by the submerged volume of the RCC, as shown in FIG. 8. The volume of one-half the RCC is $$V_{RCC} = \frac{1}{2}r^2 h. \quad (28)$$

The volume as a function of position of the center-of-volume is $$V = V(z) = V_{RCC} + \int_\zeta^\eta \pi r^2 dz = V_{RCC} + \pi r^2(\eta - \zeta). \quad (29)$$

The equation-of-motion becomes $$m\ddot{\zeta} = -b\dot{\zeta} - mg + \rho g V + F_u. \quad (30)$$

Substitution of Eq. (29) into Eq. (30) yields $$m\ddot{\zeta} = -b\dot{\zeta} - mg + \rho g V_{RCC} + \pi r^2(\eta - \zeta) + F_u. \quad (31)$$

The equilibrium position is $$mg = \rho g V_{RCC} \quad (32)$$

which then yields, after simplification $$m\ddot{\zeta} + b\dot{\zeta} + \rho g \pi r^2 \zeta = \rho g \pi r^2 \eta + F_u. \quad (33)$$

Note that $\zeta$ is the vertical position of the center of the RCC buoy geometry and $\eta$ is the wave elevation or driving input to the system, as shown in FIG. 8, for either regular or irregular waves.

An additional nonlinear (NL) restoring force, $F_{NL}$, can be introduced into the equation-of-motion as $$m\ddot{\zeta} + b\dot{\zeta} + k_{LIN2}\zeta = F_{ex} + F_u + F_{NL}. \quad (34)$$

where $k_{LIN2} = \mu g \rho r^2$ and the external wave force input is $F_{ex} = k_{LIN2}\eta$. The nonlinear restoring force can be introduced as a regulatory cubic spring along with resistive damping (rate feedback) control or $$F_{NL} = -k_{NL2}\zeta^3 \quad (35)$$

$$F_u = -R_{opt}\dot{\zeta}. \quad (36)$$

The Hamiltonian for the RCC WEC is $$\mathcal{H}_{buoy} = T_{buoy} + V_{buoy} = \frac{1}{2}m\dot{\zeta}^2 + \frac{1}{4}K_{NL2}\zeta^4 \quad (37)$$

in contrast to the Hamiltonian for the HG WEC design described by Eq. (27).

The RCC model can formally employ a nonlinear feedback control with position error and rate feedback defined as $$F_{NL} = 0 \quad (38)$$

$$F_u = k_{NL2}(\hat{\eta} - \hat{\eta})^3 R_{opt}\dot{\zeta}. \quad (39)$$

When the cubic term is expanded $$F_u = K_{NL}(\hat{\eta}^3 - 3\hat{\eta}^2\zeta + 3\hat{\eta}\zeta^2 - \zeta^3) - R_{opt}\dot{\zeta} \quad (40)$$

the individual terms compare similarly to the HG model interaction with the waves, as described in Eq. (26).

This nonlinear feedback strategy focuses on nonlinear oscillations to multiply and/or magnify the energy and power capture from the WEC device. By introducing a cubic spring in the feedback loop a significant increase in power capture results. With the RCC WEC with nonlinear feedback, this can be realized as a mechanical nonlinear spring in combination with an energy storage device to help transmit reactive power between cycles or geometric modifications. Alternatively, according to the present invention, the cubic hardening spring can be realized by shaping the buoy to produce reactive power directly from the waves.

In contrast to the HG model with resistive damping feedback of the present invention, the RCC model with nonlinear feedback control requires the following: i) estimated wave elevation $\hat{\eta}$ and ii) measured vertical buoy position $\hat{\zeta}$. The benefit of the HG model of the present invention is that the reactive power and energy storage system requirements are inherently embedded in the nonlinear buoy geometry, therefore requiring only simple rate-feedback control. In addition, the estimated wave elevation and vertical buoy position are intrinsic to the HG WEC.

Case Study Simulation Results

Exemplary case studies and simulation results are described below for: i) nonlinear resonator, ii) single frequency inputs, and iii) multi-frequency spectrum inputs. A simplified optimal HG WEC design (optimize a subject to volumetric constraints leading to draft limits) is contrasted with a RCC WEC design. A volume constraint on displaced fluid is imposed on both the RCC and HG buoys to be equivalent:

$$V_{HG} = V_{RCC}. \quad (41)$$

The position constraint for the RCC and the HG WECs resulted in the draft limits shown in Table 2. The simplified optimization for the HG WEC, used for the Bretschneider spectrum, is a function of $\alpha$ which constrains the heave motion and the wave height. Note that $\alpha$ will be sea state dependent and can be adapted to meet each specific sea state condition for the actual application. For this example, the buoy effective mass was $m = 1.76 \times 10^5$ kg, the linear damping coefficient was $b = 170$ Ns/m, and linear stiffness coefficient was $k = 4.544915 \times 10^5$ kg/s$^2$. The nonlinear stiffness coefficient used for the RCC$_{NL}$ case was $K_{NL} = 1.41 \times 10^4$ N/m$^3$. The damping and nonlinear stiffness for the RCC buoy is from Wilson. See D. Wilson et al., "Nonlinear Control Design for Nonlinear Wave Energy Converters," *John L. Junkins Dynamical Systems Symposium*, College Station, Tex., May 2018. To constrain the maximum displacement for the RCC buoy, the linear damping coefficients were increased as given in Table 2. This prevents the RCC buoy from coming out of the water or totally submerging, causing over-topping.

Nonlinear Resonator Results

Figure 9B:
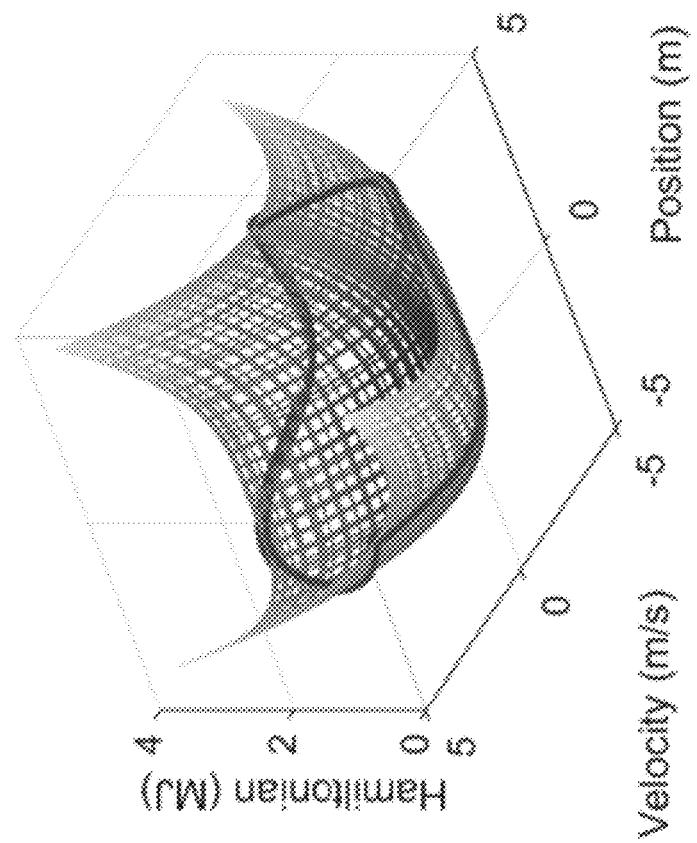
FIG. 9B illustrates the limit cycle for a NL HG buoy.
Figure 9A:
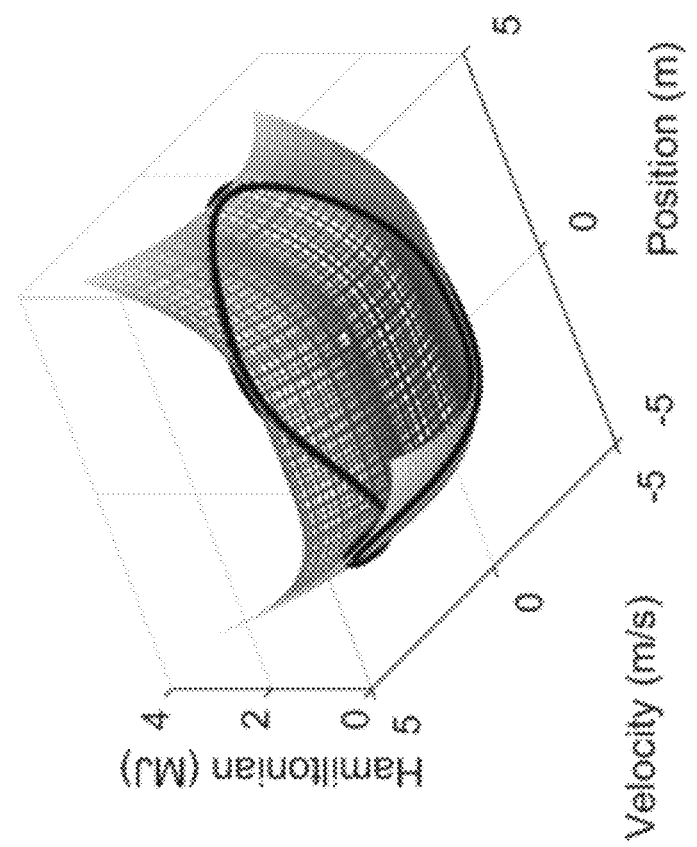
FIG. 9A illustrates a single frequency limit cycle constrained to the Hamiltonian surface for a RCC buoy with a nonlinear (NL) cubic spring.
Figures 10A, 10B:
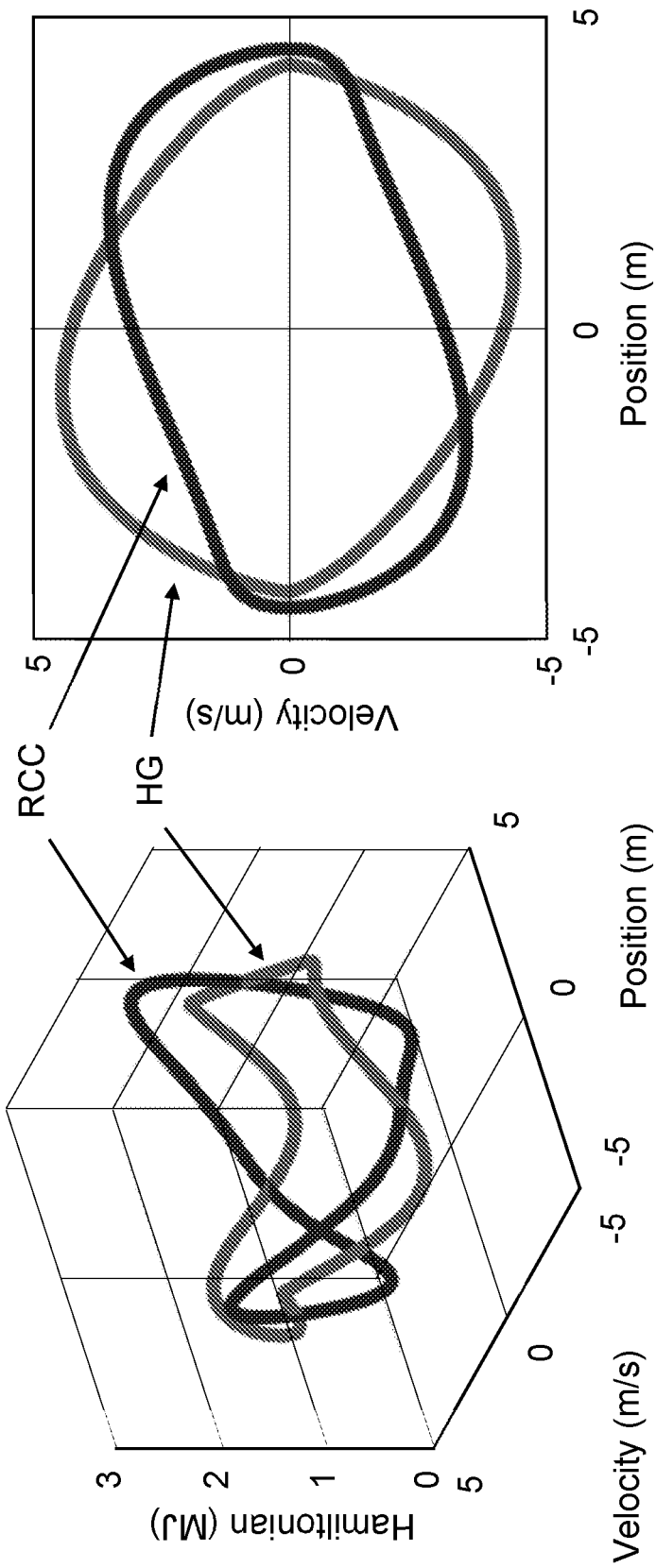
FIG. 10A compares the NL limit cycles for the RCC and HG buoys in 3D.
FIG. 10B shows the comparison in phase-plane.

The design characteristics of a simple RCC with nonlinear control (utilizing a cubic spring) can be used to evaluate a NL geometric shape, resulting in a HG WEC design. The nonlinear limit cycles, constrained to the Hamiltonian surface, for the RCC NL cubic spring WEC design as compared to the HG WEC design are shown in FIGS. 9A and 9B, respectively. The corresponding nonlinear limit cycle and phase-plane comparisons are shown in FIGS. 10A and 10B, respectively.

The differences in the shapes and responses can be traced back to the comparison of Eqs. (26), (34), and (40), respectively. Initially, the HG WEC design includes the cubic expansion and interaction between the device and the fluid media, whereas the initial RCC WEC does not. Regardless, a nonlinear control design was employed to design a nonlinear geometric HG WEC with the desired effects and characteristics associated with providing reactive power that is intrinsic to the design.

Single Frequency Results

Figure 11:
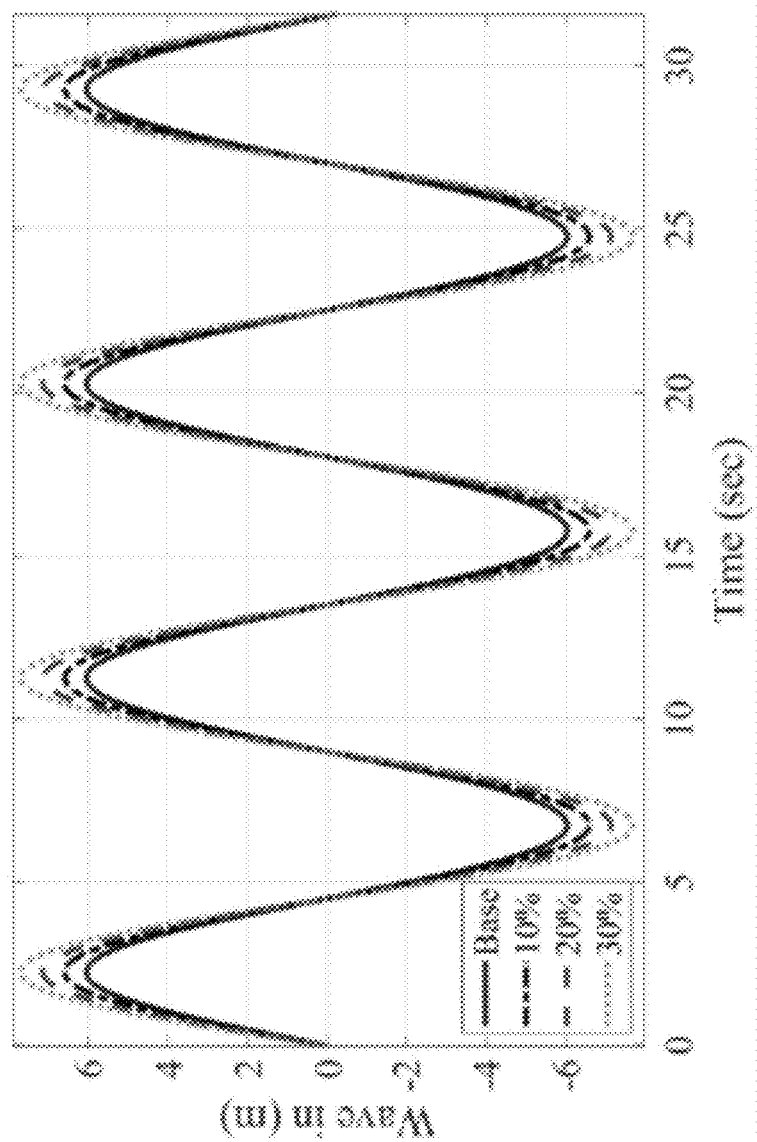
FIG. 11 is a graph of external wave input for the first 30 of 100 second duration.

Numerical simulation results are described below for each of the variations considered. The RCC WEC design included both a PDC3 (RCC) and a nonlinear cubic spring ($RCC_{NL}$) controller. Initially, the HG WEC design (HG) used an a value to match the corresponding PDC3 RCC WEC design. These three designs are considered as the baseline designs during the numerical simulation results. The full draft potential for the HG WEC design was investigated by comparing the HG and RCC WEC designs for incrementally increasing wave heights (10%, 20%, 30%). These are noted as subscripts in the numerical results ($RCC_{10}$, $HG_{10}$, $RCC_{20}$, $HG_{20}$, $RCC_{30}$, $HG_{30}$). All results were performed over a 100 second time window. A 0.111 Hz single frequency wave input was employed for all cases. The first 30 seconds of the 100 second duration window are shown in FIG. 11.

Figure 12:
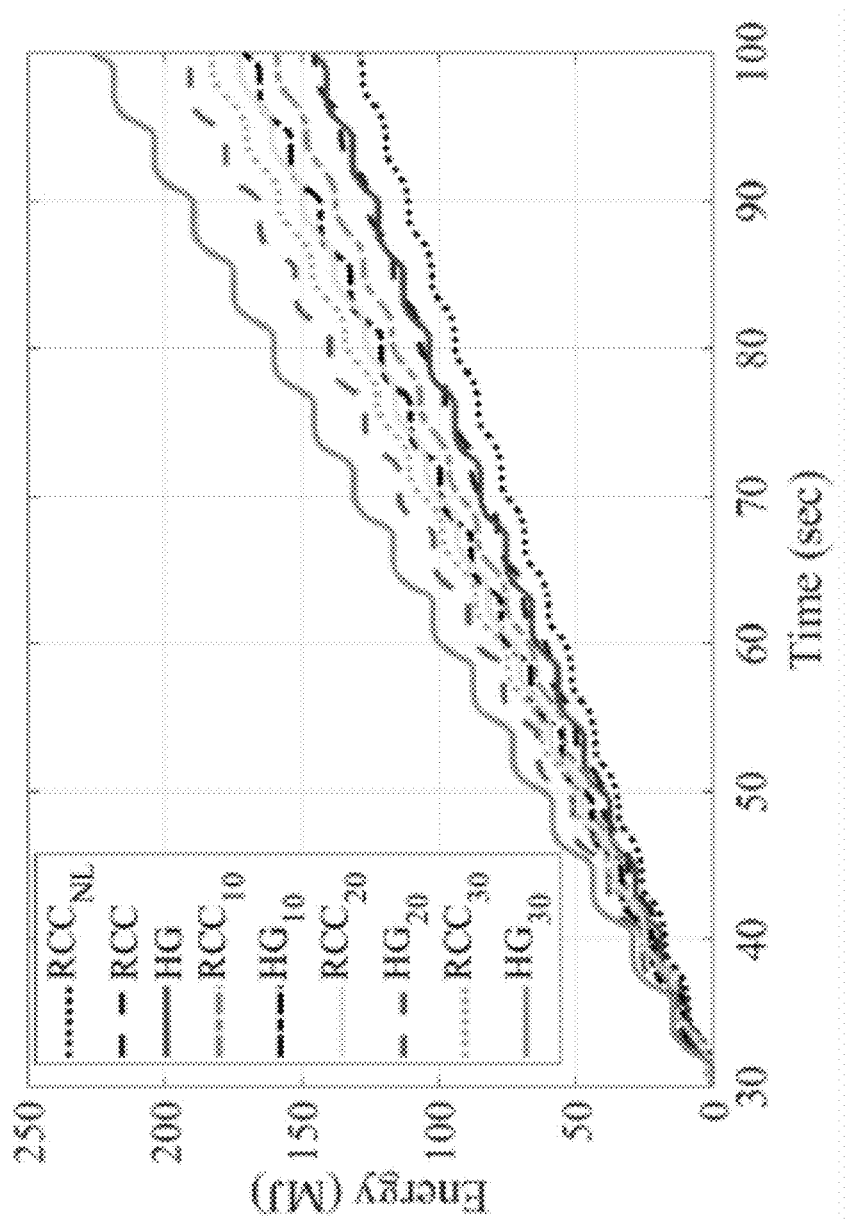
FIG. 12 is a graph of harvested energy for all cases.

The harvested energy for all buoy designs is shown in Table 2 and FIG. 12, respectively. Table 2 includes: 1) α, steepness angle limit, 2) $\bar{R}_{opt}$, effective damping for the RCC buoys, 3) $h_{limit}$, draft limit for all buoys, and 4) $E_{max}$, the maximum harvested energy for the 100 second duration, used as a metric of performance for all buoy designs. The harvested energy was determined between 30 and 100 seconds to avoid initial transients, such that all buoys are in steady state operation. Overall, the HG buoy designs resulted in increased harvested energy, 6.9%, 13.9%, and 23.5%, for increased waves; 10%, 20%, and 30% in comparison to the corresponding RCC buoy designs.

Figure 13:
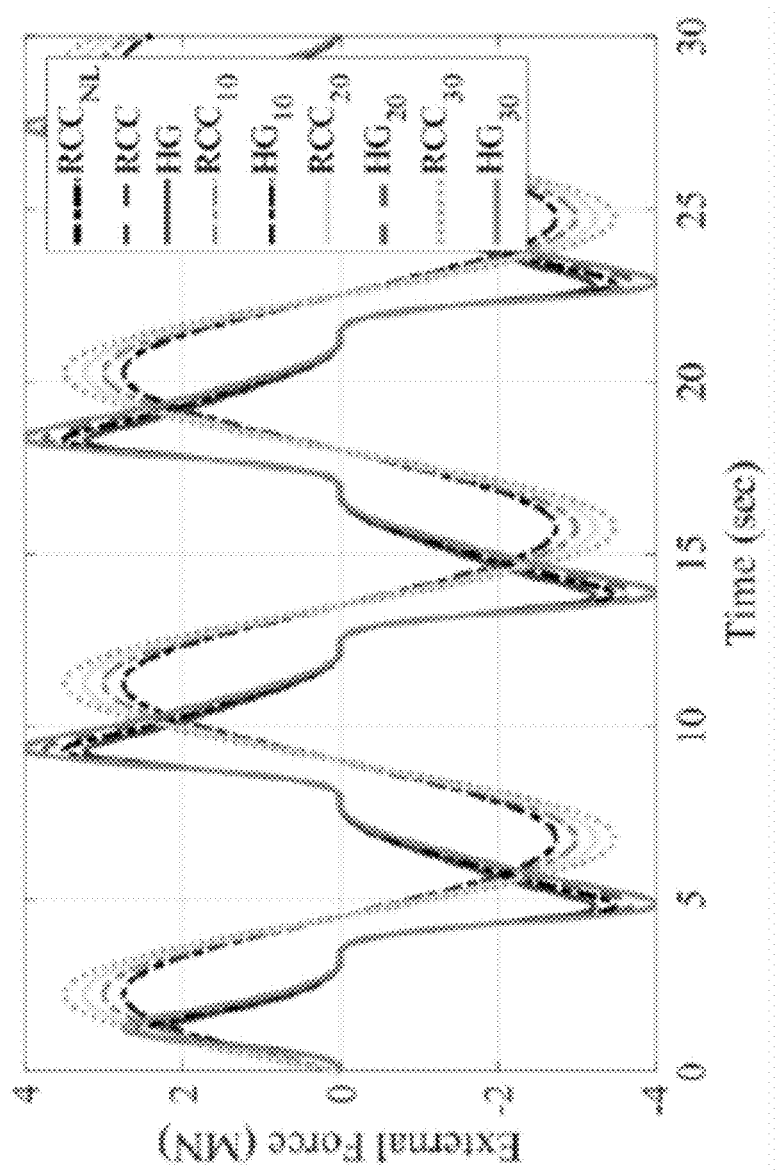
FIG. 13 is a graph of external wave forces for the first 30 seconds of 100 second duration for all cases.
Figure 14:
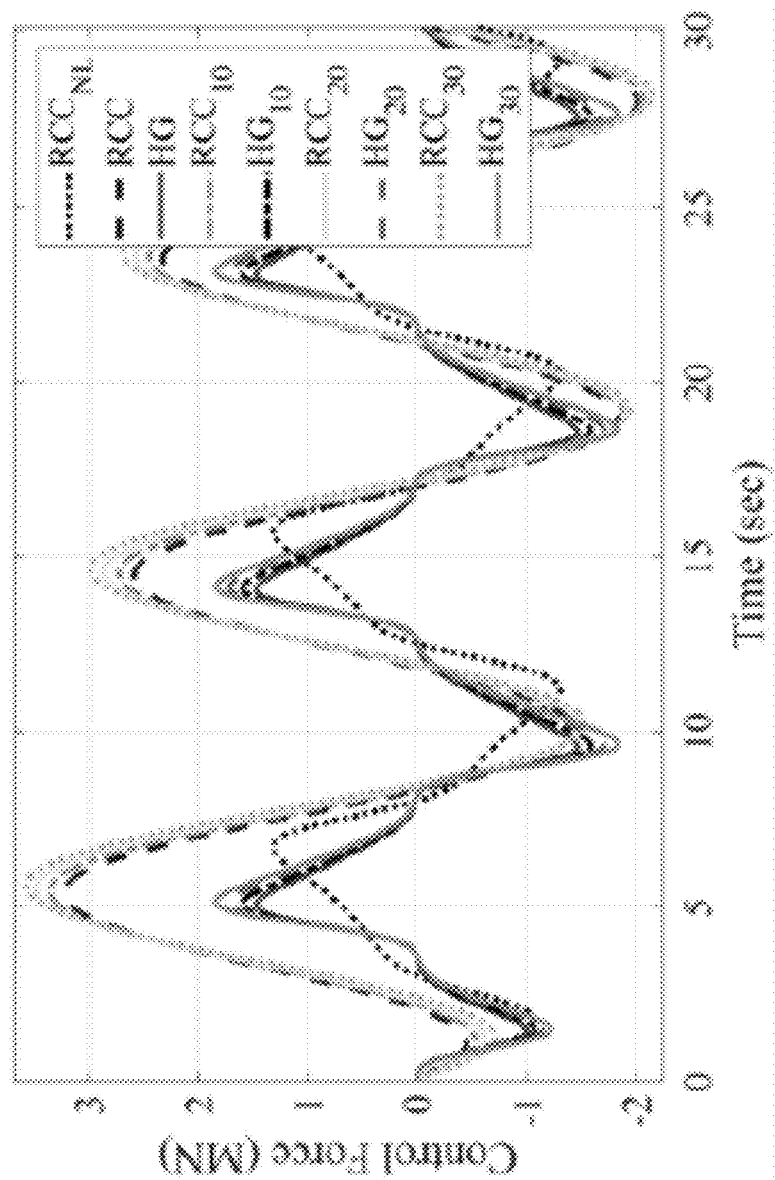
FIG. 14 is a graph of control forces for the first 30 seconds of 100 second duration for all cases.

The external forces and control forces for all cases are shown in FIGS. 13 and 14, respectively. After an initial 10 second period, the transient responses converge to steady-state operation.

Figure 15:
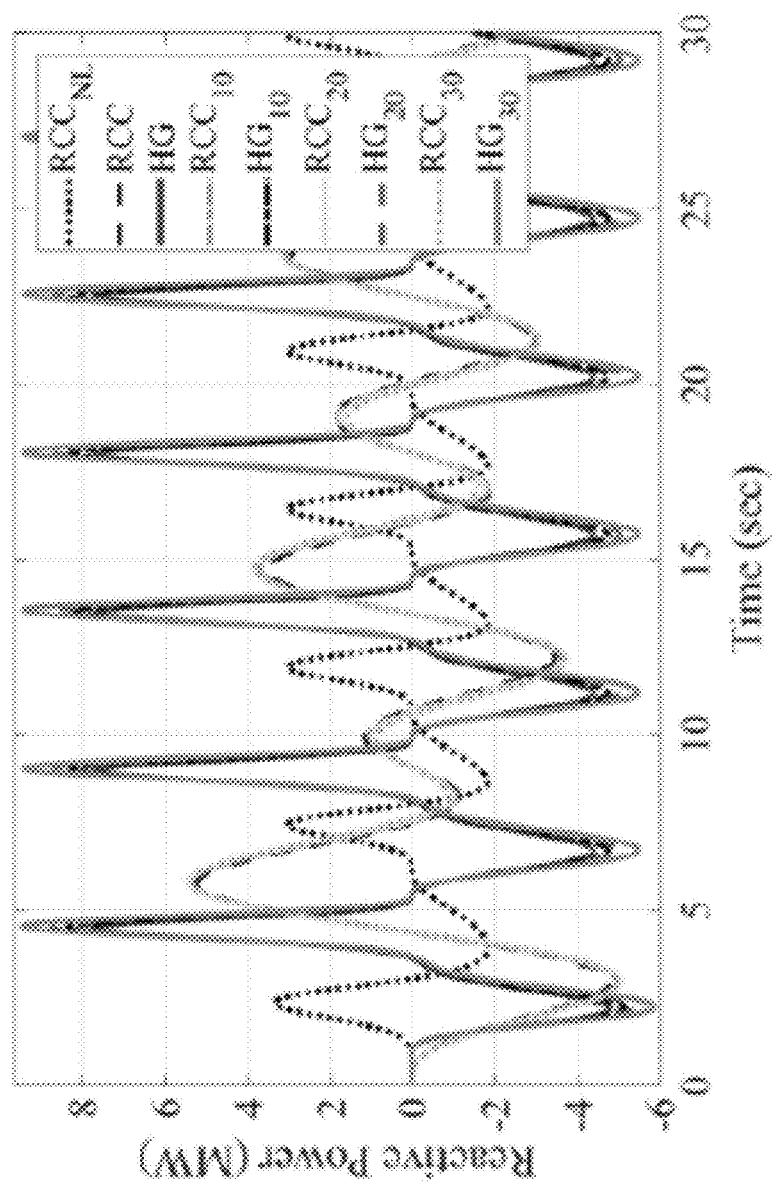
FIG. 15 is a graph of reactive powers for the first 30 seconds of 100 second duration for all cases.

The RCC and PDC3 reactive power responses are symmetric and cancel point-by-point (linear) at resonance. See R. Robinett and D. Wilson, *Nonlinear Power Flow Control Design: Utilizing Exergy, Entropy, Static and Dynamic Stability, and Lyapunov Analysis*, Springer-Verlag London Limited (2011); and R. Robinett and D. Wilson, *Int. J. Control* 81, 1886 (2008). For the more general solution, the point-by-point force balance is replaced by a cyclic balance between the power flowing into the system versus the power being dissipated within the system (or equal area under the reactive power curve) or $$\tilde{H}_{cyclic} = \int_\tau \dot{H} dt = 0 \tag{42}$$

where τ is over the cycle time. For the nonlinear responses, the RCC with nonlinear feedback and the HG will have equal areas over their respective cycles. The reactive power for all cases is shown in FIG. 15.

Figure 16:
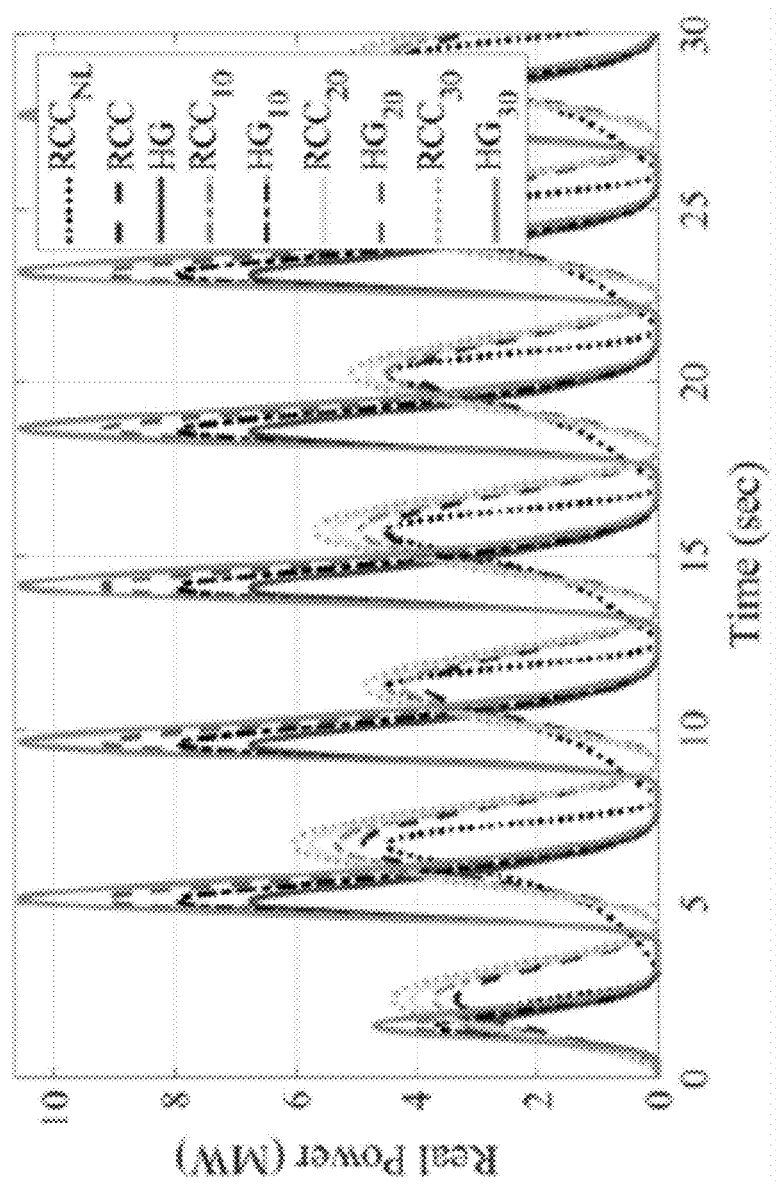
FIG. 16 is a graph of real powers for the first 30 seconds of 100 second duration for all cases.

The real power for all cases is shown in FIG. 16. For increasing wave input, the HG buoys increase in real power production at a higher rate than the equivalent RCC buoy designs.

Figure 17:
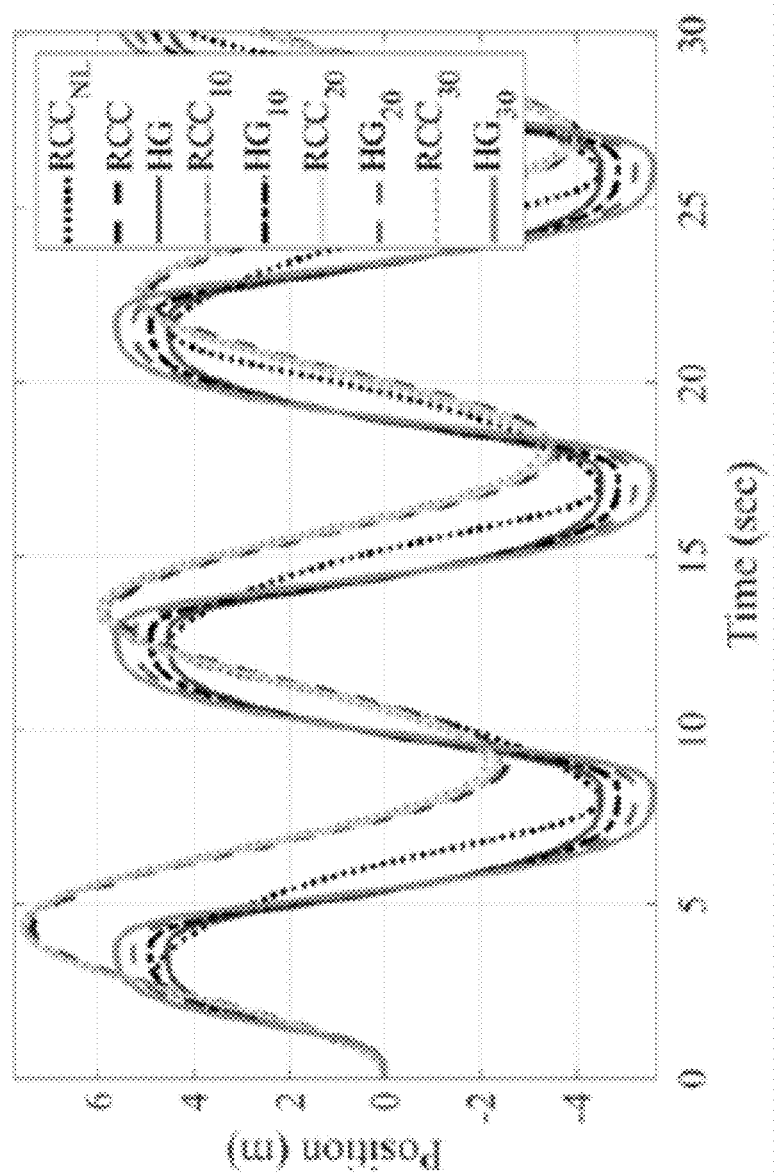
FIG. 17 is a graph of buoy positions for the first 30 seconds of 100 second duration for all cases.
Figure 18:
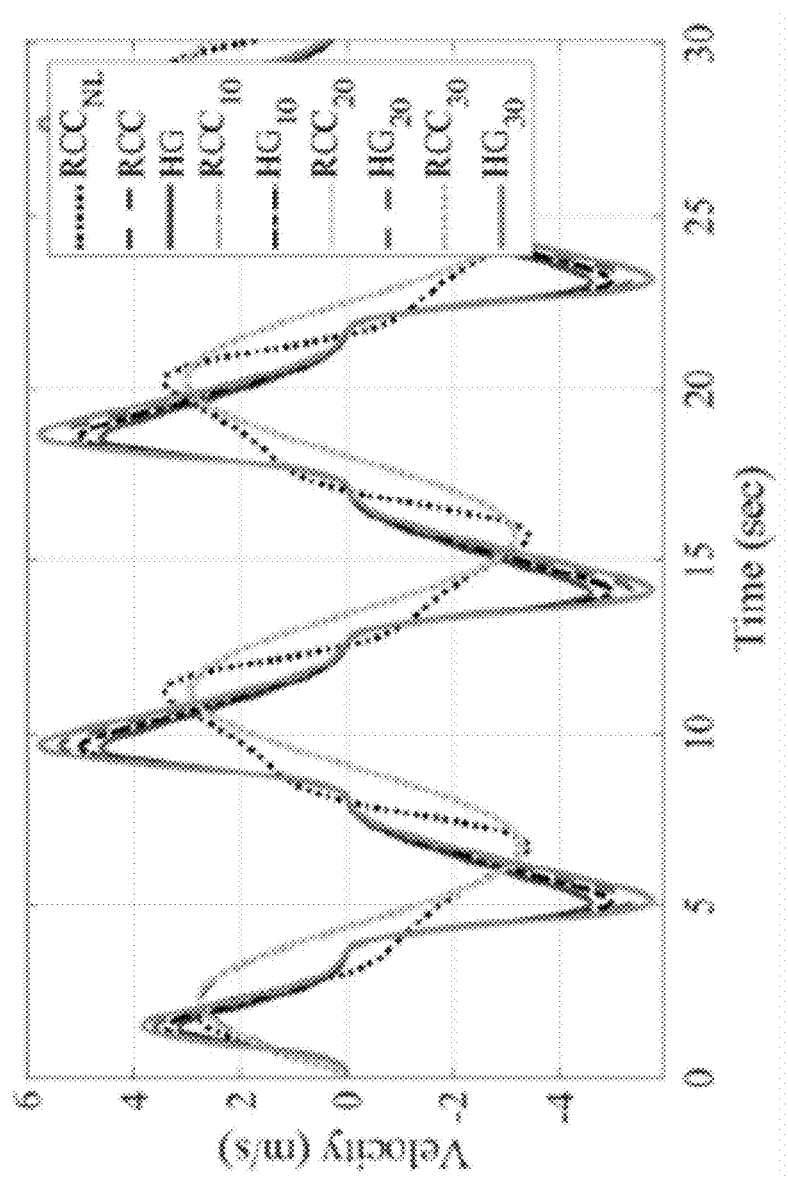
FIG. 18 is a graph of buoy velocities for the first 30 seconds of 100 second duration for all cases.

The corresponding buoy position and velocity responses for all cases are shown in FIGS. 17 and 18, respectively. Each buoy design position response observes the $h_{limit}$ parameter given in Table 2. For increasing wave inputs, the corresponding velocity responses also increase, resulting in higher speeds and real power production (primarily for the HG buoy).

Bretschneider Multi-Spectrum Results

Figure 19:
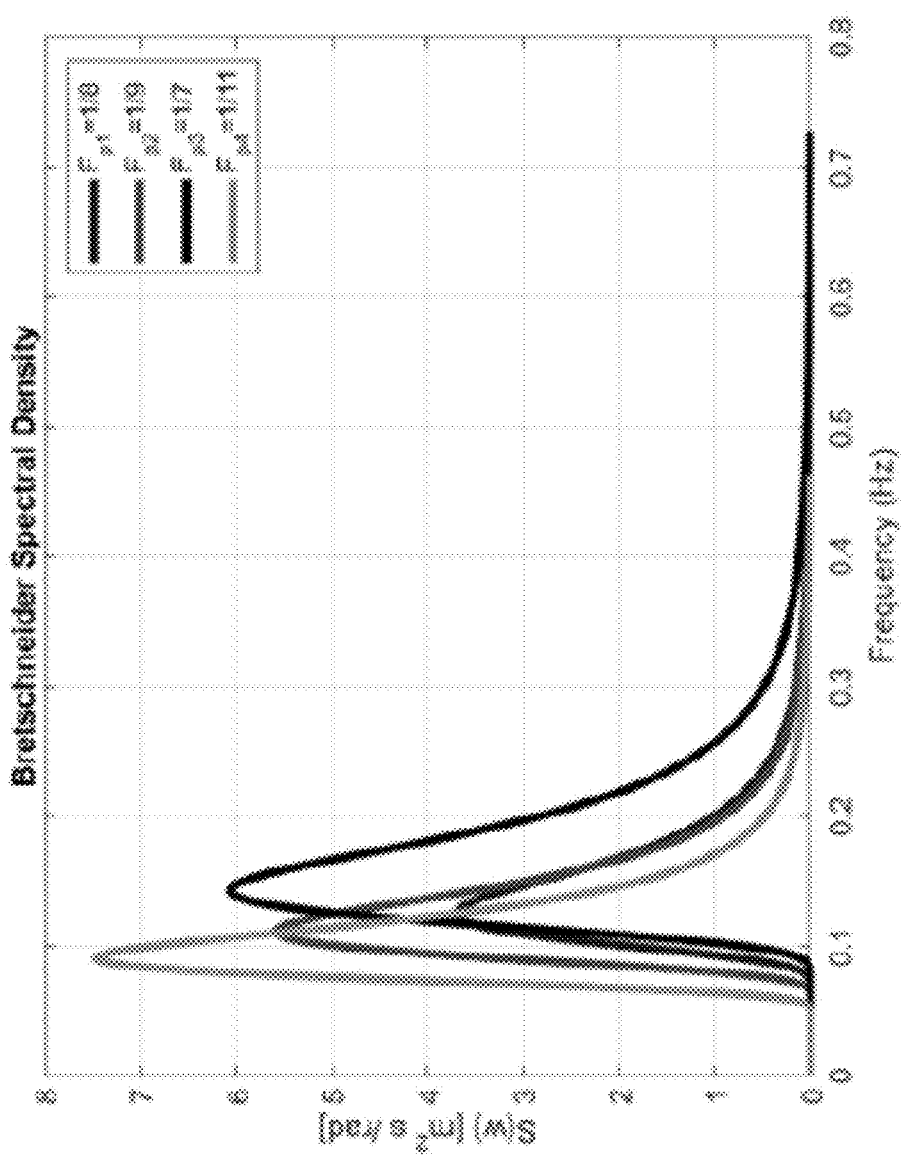
FIG. 19 is a graph of Bretschneider spectral density for all sea states.

A Bretschneider multi-spectrum containing multi-frequency content includes four varying sea states with five minute durations. These were generated for the HG buoy design to fully evaluate the power/energy capture extraction. These varying sea states were derived based on actual buoy data from Nags Head, N.C. with a scale factor of 3 applied to boost the wave height $H_s$ to provide sufficient amplification for the HG buoy to be evaluated. The spectrum was generated with the Bretschneider and corresponding time domain data by spec2dat Matlab functions from the toolbox according to Perez. See T. Perez and T. A. Fossen, *Model. Ident. Control* 30, 1 (2009). The varying sea state parameters are given in Table 3 with the corresponding Bretschneider spectrum in the frequency domain shown in FIG. 19.

TABLE 2

Single frequency numerical results.

| Parameter | Unit | $RCC_{NL}$ | RCC | HG | $RCC_{10}$ | $HG_{10}$ | $RCC_{20}$ | $HG_{20}$ | $RCC_{30}$ | $HG_{30}$ |
|---|---|---|---|---|---|---|---|---|---|---|
| α | deg | N/A | N/A | 59.5 | N/A | 56.5 | N/A | 53.5 | N/A | 50.9 |
| $\bar{R}_{opt}$ | (Ns/m)10$^5$ | 3.844 | 4.456 | N/A | 4.848 | N/A | 5.242 | N/A | 5.746 | N/A |
| $h_{limit}$ | m | 4.47 | 4.47 | 4.53 | 4.47 | 4.896 | 4.47 | 5.274 | 4.47 | 5.614 |
| $E_{max}$ | MJ | 129 | 146 | 146 | 160 | 171 | 173 | 197 | 183 | 226 |

TABLE 3

Sea state parameters.

| Sea State | $H_s$ (m) | $T_p$ (sec) | Duration (sec) |
|---|---|---|---|
| 1 | 5.7 | 8.0 | 300.0 |
| 2 | 6.6 | 6.6 | 300.0 |
| 3 | 7.8 | 7.8 | 300.0 |
| 4 | 6.9 | 11.0 | 300.0 |

The HG design was evaluated with a volumetric constraint given by Eq. (41). The steepness or cone angle, a, shown in FIG. 7, was swept from 55-75 degrees to define the design space for each varying sea state. For all sea states, $$R_{opt} = 4.4044 \left( N \frac{s}{m} \right) 10^5.$$

The energy captured at the end of the 5 minute duration was recorded and the results are given in Table 4.

TABLE 4

HG buoy Bretschneider spectrum sea state results.

| Angle α degree | Draft $h_{half}$ m | Sea State 1 $E_{max}$ MJ | Sea State 2 $E_{max}$ MJ | Sea State 3 $E_{max}$ MJ | Sea State 4 $E_{max}$ MJ |
|---|---|---|---|---|---|
| 55 | 5.084 | 26.485 | 23.935 | 174.63 | 32.230 |
| 60 | 4.470 | 43.240 | 39.235 | SAT | 48.564 |
| 65 | 3.8767 | 67.170 | 61.550 | — | 69.790 |
| 70 | 3.2864 | SAT | 92.752 | — | SAT |
| 75 | 2.680 | — | SAT | — | — |

Figure 20:
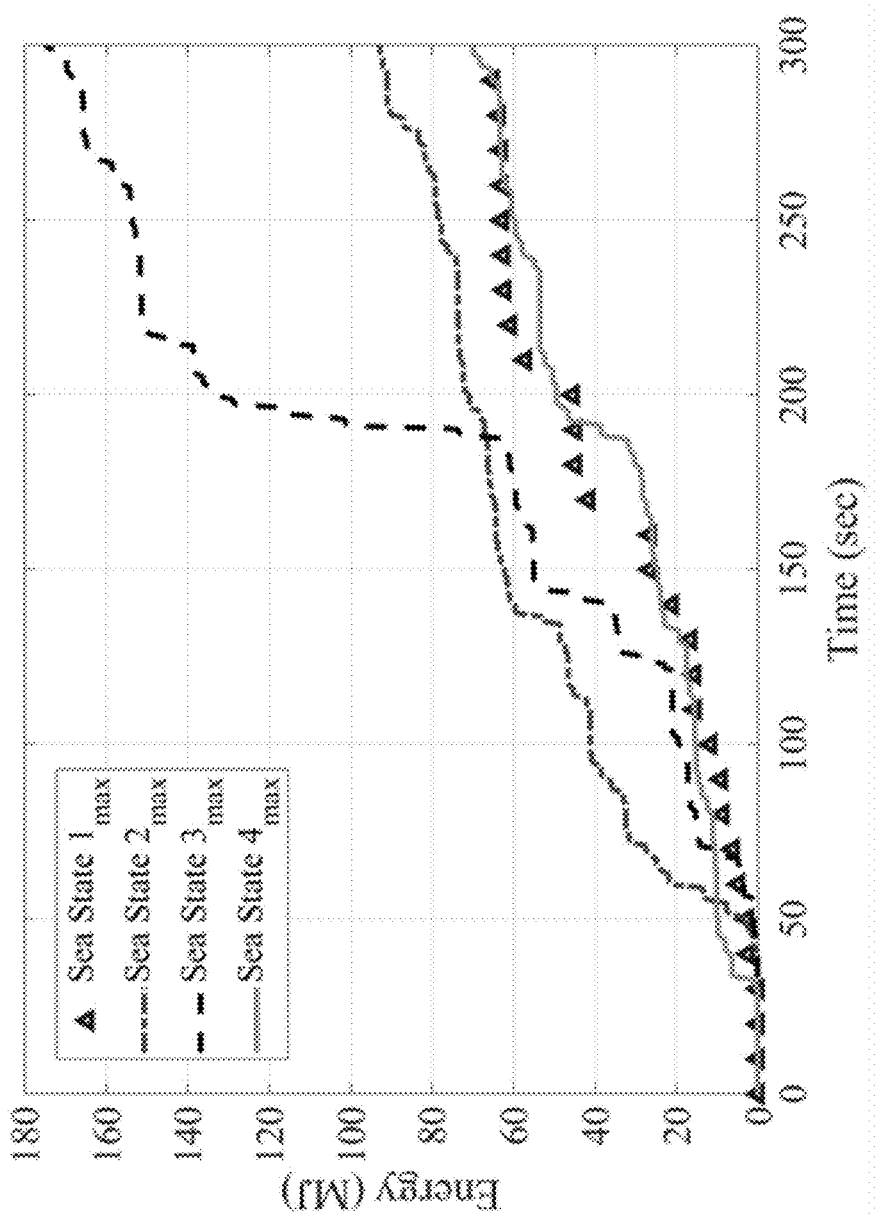
FIG. 20 is a graph of harvested energy for all varying sea states.

A SAT recorded in a table column indicates the HG buoy for the corresponding α angle saturated the geometric upper/lower vertical displacement limits and the previous angle is considered the maximum energy capture result. Saturation indicates that the HG buoy is either completely out of the water or totally submerged and over-topping. The maximum energy captured for each sea state is plotted in FIG. 20.

Figure 21B:
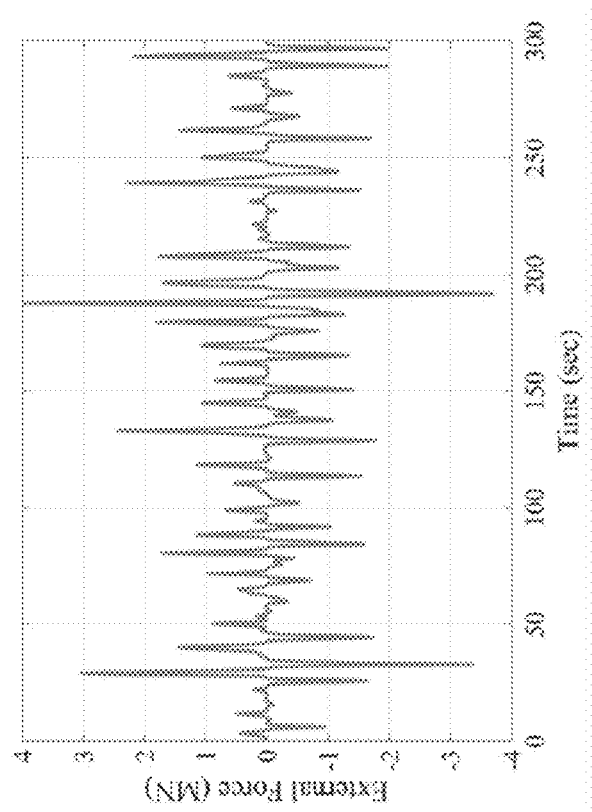
FIG. 21B is a graph of the external wave force.
Figure 21A:
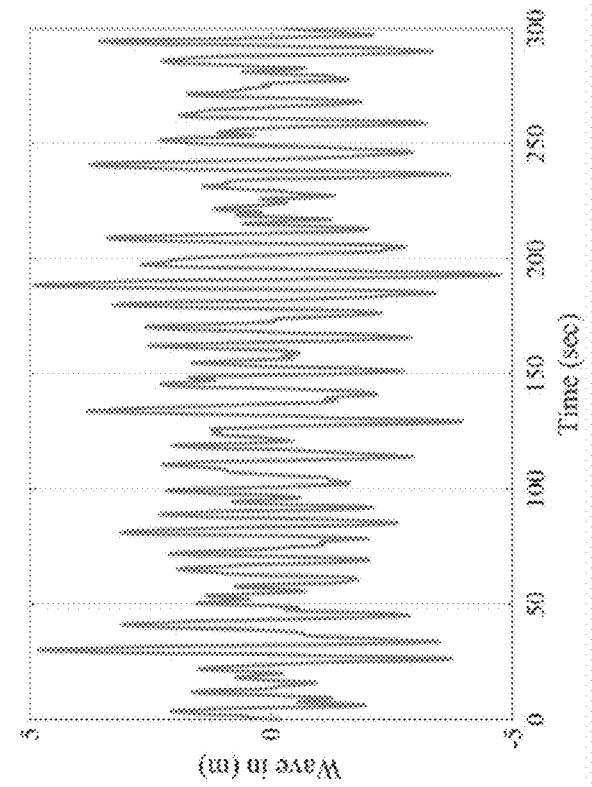
FIG. 21A is a graph of sea state 4 (SS4) external Bretschneider wave input.
Figure 22B:
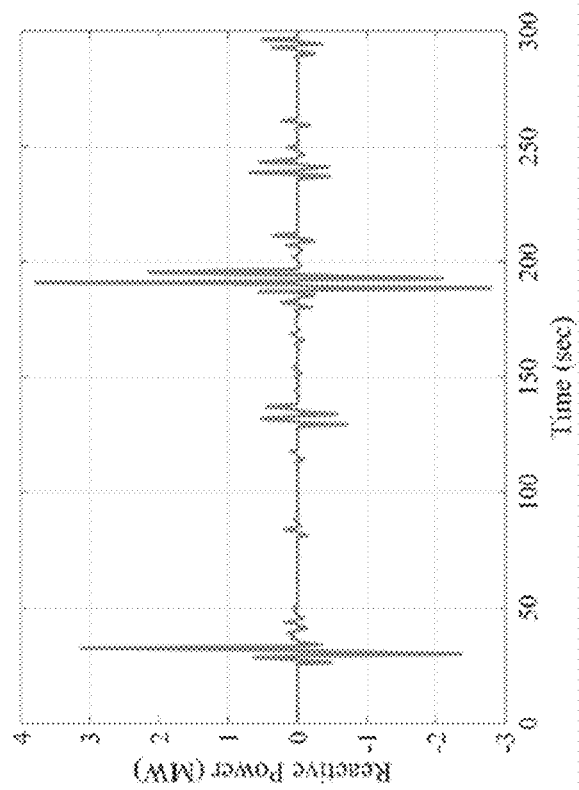
FIG. 22B is a graph of reactive power.
Figure 22A:
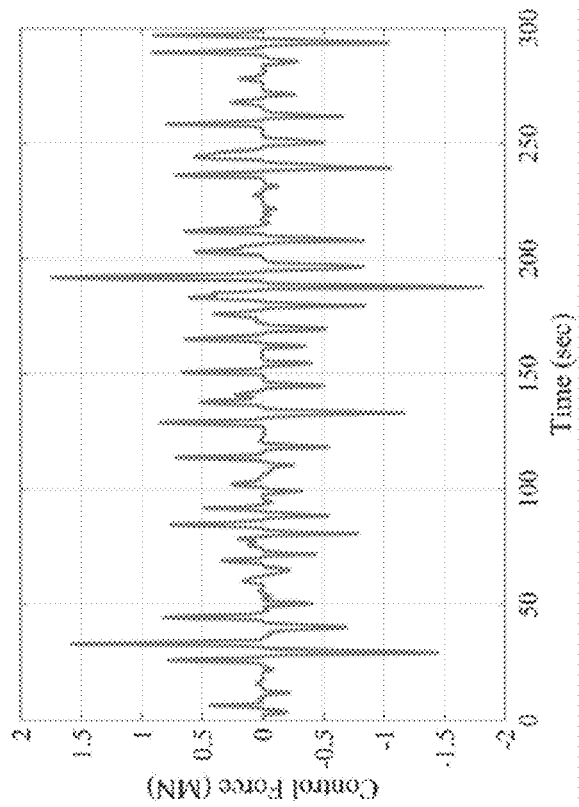
FIG. 22A is a graph of SS4 control force.
Figure 23B:
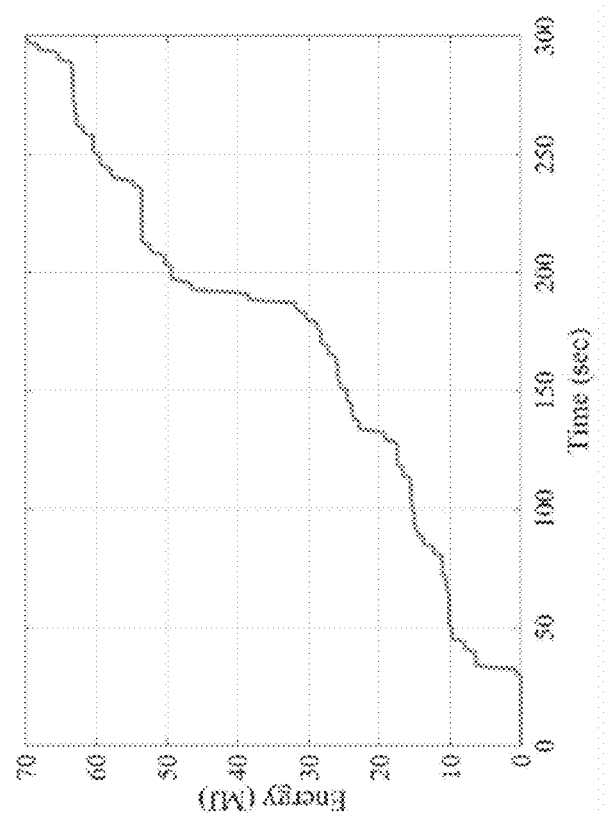
FIG. 23B is a graph of harvested energy.
Figure 23A:
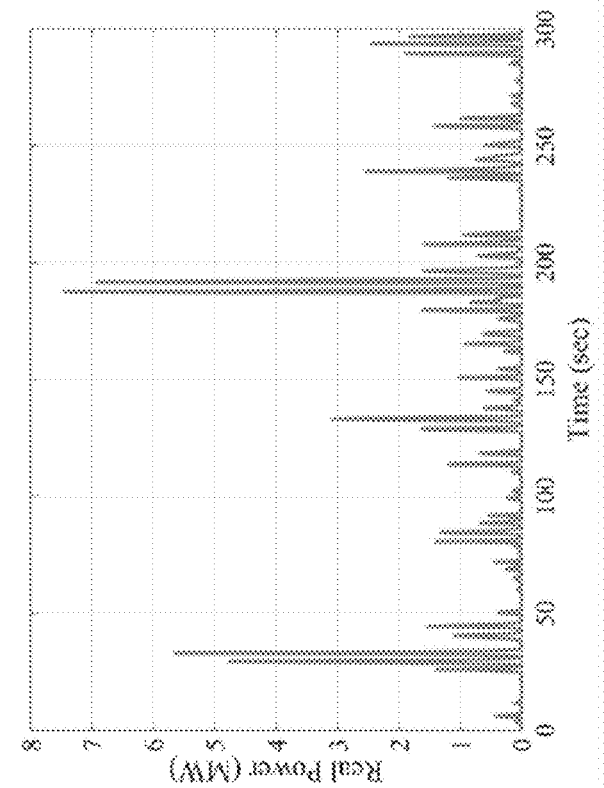
FIG. 23A is a graph of SS4 real power.
Figure 24B:
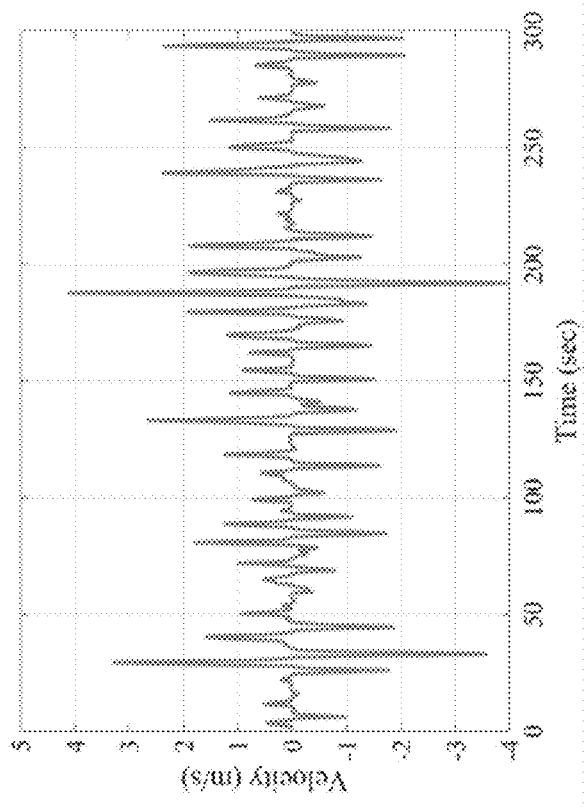
FIG. 24B is a graph of velocity.
Figure 24A:
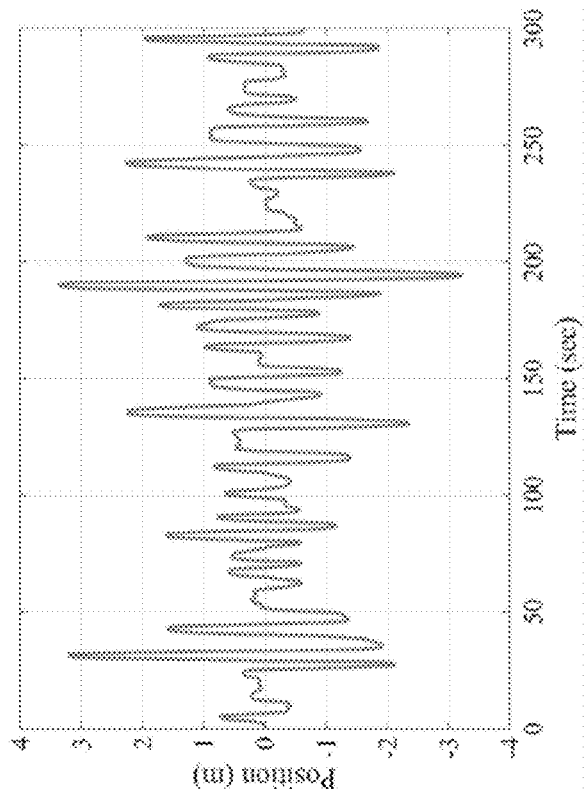
FIG. 24A is a graph of SS4 position.

The complete time simulation results for sea state 4 (SS4) are shown in the following figures. The corresponding Bretschneider wave input and external force are shown in FIGS. 21A and 21B, respectively. The control force and reactive power are shown in FIGS. 22A and 22B, respectively. The real power and harvested energy are shown in FIGS. 23A and 23B, respectively. The reactive power is generated intrinsically by the NL HG buoy geometry. Positive values represent power and harvested energy from the WEC devices. The final harvested energy value at the end of the 5 minute duration (FIG. 23B) corresponds to the tabulated value 75.6 MJ in Table 4. The WEC buoy position and velocity are given in FIGS. 24A and 2B, respectively. The trend shows that for increased a the power and harvested energy increase. However, given the volume constraint on the HG design, the draft decreases as a increases which constrains the upper limit on the maximum power/energy capture, since the motion of the HG WEC is constrained. For these realistic wave forms the HG WEC shows desirable characteristics.

The examples described above assumed a mirrored right circular cone with variable cone angle. In general, the cone angle can be about 50° or greater to produce a significant reactive force. However, other shapes and variations thereof can provide a cubic hardening spring equivalent. Indeed, whenever the buoy shape is not perpendicular to the water line and is curved outwardly from the vertical axis of the buoy away from the water line, then the hydrostatic force will be nonlinear. Typically, the buoy shape can be axisymmetric about the buoy axis but is not required to be so. Typically, the buoy can comprise opposing shapes that are mirrored about the water line. For example, the buoy shape can comprise a polynomial spline expansion of the form, $z=a+bx+cx^2+dx^3+ex^4+\ldots$ where a, b, c, d, and e are arbitrary coefficients, rotated about the vertical axis. For example, the shaped buoy can comprise a hyperboloid of revolution about the buoy axis. For example, the shaped buoy can comprise opposing hemispheres, pyramids, ellipsoids, or paraboloids. However, the opposing surfaces need not be mirrored geometries, symmetric about the water line, or of the same shape.

The present invention has been described as nonlinear hydrostatic control of a wave energy converter. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nonlinear wave energy converter, comprising:
 a shaped buoy in a body of water having a wave motion, wherein the waves impacting the buoy exert an excitation force with a plurality of excitation frequencies on the buoy that causes a buoy motion in a heave direction relative to a reference and wherein the buoy has a shape such that a water plane area increases with distance away from the water line in the heave direction both above and below the water line, thereby producing reactive power from the wave motion; and
 an actuator configured to convert the buoy motion to electrical energy; wherein the shaped buoy comprises opposing shapes that are mirrored about the water line.

2. The nonlinear wave energy converter of claim 1, wherein the shape of the shaped buoy is determined by Hamiltonian surface-shaping and power flow control to harvest maximum energy from the wave motion.

3. The nonlinear wave energy converter of claim 1, wherein the shaped buoy comprises an hourglass shape.

4. The nonlinear wave energy converter of claim 3, wherein the hourglass shape comprises mirrored right circular cones having a cone angle.

5. The nonlinear wave energy converter of claim 4, wherein the cone angle is greater than 50 degrees.

6. The nonlinear wave energy converter of claim 4, wherein the cone angle is selected to harvest maximum energy from the wave motion.

7. The nonlinear wave energy converter of claim 1, wherein the shaped buoy comprises mirrored hemispheres, pyramids, ellipsoids, paraboloids, or hyperboloids.

8. The nonlinear wave energy converter of claim 1, wherein the shaped buoy comprises a shape of a polynomial spline expansion.

* * * * *